United States Patent
Minami et al.

(10) Patent No.: US 6,734,270 B1
(45) Date of Patent: May 11, 2004

(54) POLYPROPYLENE-BASED CALENDERED ARTICLE AND INJECTION-MOLDED ARTICLE

(75) Inventors: Yutaka Minami, Chiba (JP); Masami Kanamaru, Chiba (JP); Koji Kakigami, Chiba (JP); Atsuhiko Ubara, Chiba (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 1 day.

(21) Appl. No.: 10/089,066

(22) PCT Filed: Oct. 5, 2000

(86) PCT No.: PCT/JP00/06942

§ 371 (c)(1),
(2), (4) Date: Apr. 5, 2002

(87) PCT Pub. No.: WO01/25299

PCT Pub. Date: Apr. 12, 2001

(30) Foreign Application Priority Data

Oct. 6, 1999 (JP) ............................. 11/285638
Oct. 28, 1999 (JP) ............................. 11/307135

(51) Int. Cl.$^7$ ............................. C08F 4/44; C08F 110/06
(52) U.S. Cl. ....................... 526/351; 526/348; 526/160; 526/161; 526/172
(58) Field of Search ............................... 526/348, 351, 526/160, 161, 172

(56) References Cited

FOREIGN PATENT DOCUMENTS

| | | |
|---|---|---|
| EP | 1 153 944 | 11/2001 |
| JP | 10-265527 | 10/1998 |
| JP | 11-166084 | * 6/1999 |
| JP | 2000-355612 | 12/2000 |

OTHER PUBLICATIONS

Patent Abstracts of Japan, JP 11–166084, Jun. 22, 1999.
Patent Abstracts of Japan, JP 10–265527, Oct. 6, 1998.
Patent Abstracts of Japan, JP 2000–355612, Dec. 26, 2000.

* cited by examiner

*Primary Examiner*—Roberto Rabago
(74) *Attorney, Agent, or Firm*—Oblon, Spivak, McClelland, Maier & Neustadt, P.C.

(57) ABSTRACT

A polypropylene-based calendered or injection-molded article satisfying the requirements of (1) having a tensile modulus TM of 5 MPa or higher and (2) having, when measured by a differential scanning calorimeter (DSC), no melting point or a melting point Tm (° C.) satisfying the formula: $TM \geq 5 \times Tm - 450$, is less tacky and excellent in flexibility and transparency. Such a polypropylene-based calendered or injection-molded article is produced from a propylene polymer satisfying the requirements of (1) having a component soluble in a 25° C. hexane in a content H25 of 0 to 80% by weight; (2) having, when measured by a differential scanning calorimeter (DSC), no melting point or a melting point Tm (° C.) satisfying the formula: $\Delta H \geq 6 \times (Tm - 140)$ wherein $\Delta H$ is a melting endotherm (J/g); and (3) having an intrinsic viscosity $[\eta]$ of 1 to 3 dl/g as measured at 135° C. in tetralin.

12 Claims, No Drawings

POLYPROPYLENE-BASED CALENDERED ARTICLE AND INJECTION-MOLDED ARTICLE

TECHNICAL FIELD

The present invention relates to a novel polypropylene-based calendered or injection-molded article, and more particularly, to a novel polypropylene-based calendered or injection-molded article with little tackiness which is excellent in flexibility and transparency and molded at low temperatures.

BACKGROUND ART

Conventionally, calendered articles have been produced by rolling a soft resin between two or more rolls to form film-like shaped or sheet-like shaped articles having a definite thickness (also called as "calendering method"), and vinyl chloride resins have been extensively used as the soft resin. It is known that the vinyl chloride resin generates harmful substances upon burning. For this reason, it has been strongly required to develop a calendered or injection-molded article made of a substitute resin. Japanese Patent Application Laid-Open No. 5-202237 discloses a calendered article that is produced by using, as the substitute resin, a specific α-olefin-polyene copolymer and an olefin polymer. However, the calendered article is poor in flexibility because a stereoregularity is as high as 98 mol %. Polypropylene is proposed as a candidate for the substitute resin. However, polypropylene is ill-balanced between flexibility and tackiness, thereby rendering it practically unusable. Recently, there has been proposed olefin polymers produced in the presence of a metallocene catalyst. Examples of such olefin polymers include a copolymer produced from ethylene and α-olefin in the presence of a metallocene catalyst. However, the copolymer has a problem of increasing the tacky component when softened. Further, the copolymer is poor in transparency and surface properties, and therefore, unsuitable as a raw material of calendered articles or injection-molded articles.

DISCLOSURE OF THE INVENTION

An object of the present invention is to provide a polypropylene-based calendered or injection-molded article with little tackiness which is excellent in flexibility and transparency and molded at low temperatures.

As a result of extensive research, the inventors have found that the above object is achieved by a polypropylene-based calendered or injection-molded article having a tensile modulus within a specific range, and exhibiting, when measured by a differential scanning calorimeter, no melting point or a melting point which satisfies a specific relationship with the tensile modulus. The present invention has been accomplished based on this finding.

Thus, the present invention provides a polypropylene-based shaped article selected from the group consisting of calendered articles and injection-molded articles satisfying the following requirements of:

(1) having a tensile modulus TM of 5 MPa or higher; and (2) having, when measured by a differential scanning calorimeter (DSC), no melting point or a melting point Tm (° C.) satisfying the following formula:

$$TM \geq 5 \times Tm - 450.$$

As a polymer for constituting the calendered and injection-molded articles, there may be preferably used a propylene polymer [A] satisfying the following requirements of:

(1) having a component soluble in a 25° C. hexane in a content H25 of 0 to 80% by weight;

(2) having, when measured by a differential scanning calorimeter (DSC), no melting point or a melting point Tm (° C.) satisfying the following formula:

$$\Delta H \geq 6 \times (Tm - 140)$$

wherein ΔH is a melting endotherm (J/g); and (3) having an intrinsic viscosity [η] of 1 to 3 dl/g as measured at 135° C. in tetralin.

The above propylene polymer [A] is preferably a propylene homopolymer [A-1] having:

(1) a meso pentad fraction [mmmm] of from 20 to 80 mol %; and (2) a racemic pentad fraction [rrrr] satisfying, together with 1–[mmmm], the following formula:

$$[rrrr]/(1-[mmmm]) \leq 0.1.$$

The propylene polymer [A] is produced by polymerizing propylene, or polymerizing propylene with ethylene and/or $C_4$–$C_{20}$ α-olefin, in the presence of a polymerization catalyst comprising:

(A) a transition metal compound represented by the following general formula (I):

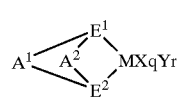

(I)

wherein $A^1$, $A^2$, $E^1$, $E^2$, M, X, Y, q and r are as defined hereinafter; and (B) at least one component selected from the group consisting of a compound (B-1) capable of forming an ionic complex by reacting with the transition metal compound (A) or a derivative thereof, and an aluminoxane (B-2).

BEST MODE FOR CARRYING OUT THE INVENTION

The polypropylene-based calendered or injection-molded article of the present invention will be described in detail below.

The polypropylene-based shaped article of the present invention is a calendered article or an in injection-molded article satisfying the following requirements of:

(1) having a tensile modulus TM of 5 MPa or higher, and (2) having, when measured by differential scanning calorimeter (DSC), no melting point or a melting point Tm (° C.) satisfying the following formula:

$$TM \geq 5 \times Tm - 450$$

preferably, $TM \geq 5$ and $TM \geq 5 \times Tm - 400$ more preferably, $TM \geq 5$ and $TM \geq 5 \times Tm - 350.$ In the present invention, the tensile modulus TM (MPa) was determined by a tensile test according to JIS K-7127 under the following conditions. A test specimen may be cut out directly from a shaped article, or may be produced by pulverizing the shaped article and then molding or forming the resultant particles into a test specimen.

Thickness of test specimen (dumbbell No. 2): 1 mm
Cross-head speed: 50 mm/min
Load cell: 100 kg
Measuring direction: machine direction (MD)

The melting point Tm (° C.) was determined using a differential scanning calorimeter ("DSC-7" available from Perkin Elmer Corp.) as follows. Specifically, 10 mg of a sample of the molded article was melted by heating at 230° C. for 3 min in nitrogen atmosphere, and then cooled to 0° C. at a rate of 10° C./min. The cooled sample was allowed to stand at 0° C. for 3 min, and then heated at a temperature rise rate of 10° C./min to obtain a melting endotherm. The peak top of the maximum peak observed in the melting endotherm curve was employed as the melting point Tm (° C.). When no peak was present in the melting endotherm curve, the sample was regarded as showing no melting point.

A polypropylene-based shaped article not satisfying the above relationships fails to provide a calendered article or an injection-molded article of the present invention, which is less tacky and excellent in flexibility and transparency. The tackiness of the polypropylene-based shaped article may be evaluated, for example, by the content H25 of a 25° C. hexane soluble that will be described below. H25 of the polypropylene-based calendered or injection-molded articles of the present invention is preferably 0 to 80% by weight, more preferably 0 to 50% by weight, and most preferably 0 to 25% by weight.

The flexibility of the polypropylene-based shaped article of the present invention may be evaluated, for example, by a tensile modulus. The tensile modulus of the calendered or injection-molded article of the present invention is preferably 1,500 MPa or lower, more preferably 1,350 MPa or lower. When a shaped article having a higher flexibility is intended, the tensile modulus is preferably 300 MPa or lower, more preferably 100 MPa or lower, and most preferably 70 MPa or lower.

The transparency of the polypropylene-based shaped article of the present invention may be evaluated by an internal haze. The internal haze may be determined, for example, from a haze value measured according to JIS K-7105. The internal haze of the polypropylene-based calendered or injection-molded article of the present invention is preferably 50% or less. When a shaped article having a higher transparency is intended, the internal haze is preferably 20% or less, more preferably 10% or less.

The polypropylene-based calendered article of the present invention may be produced by a rolling method where a softened resin is rolled between two or more rolls into film or sheet having a definite thickness (also called "calendering method") using a known apparatus under known conditions. Examples of the calendering apparatus include in-line calender, L-calender, inverted L-calender, Z-calender, etc. The calendering may be carried out under conditions of a resin temperature of 80 to 300° C. The propylene-based calendered article of the present invention is preferably produced by calendering at a resin temperature of 100 to 300° C., more preferably 120 to 280° C.

The calendered article may be formed into artificial leather, waterproof cloth or various laminates by rolling the resin together with unrolled sheet, paper or cloth. The application fields of the polypropylene-based calendered article of the present invention may include, not particularly restricted, artificial leather, waterproof cloth and various laminates, automobile parts (such as interior trims), domestic electric appliances (such as inner lining of refrigerator), etc.

The polypropylene-based injection-molded article of the present invention may be produced by a known injection-molding method. The injection-molding method usable in the present invention is not particularly restricted, and may include an ordinary injection-molding method as well as a gas injection-molding method in which a molten resin is injected together with a gas into a mold, an injection compression-molding method, or the like. The polypropylene-based injection-molded article of the present invention may be produced at a molding temperature (nozzle temperature) of 80 to 300° C., preferably 100 to 300° C., more preferably 120 to 280° C.

The application fields of the polypropylene-based injection-molded article of the present invention include automobile parts (such as interior trims), domestic electric appliances (such as housing) or the like, although not particularly limited thereto.

The polypropylene-based shaped article of the present invention is a calendered or injection-molded article produced from a propylene polymer [A], preferably a propylene homopolymer [A-1], satisfying the following requirements of:

(1) having a component soluble in a 25° C. hexane in a content H25 of 0 to 80% by weight;
(2) having, when measured by a differential scanning calorimeter (DSC), no melting point or a melting point Tm (° C.) satisfying the following formula:

$$\Delta H \geq 6 \times (Tm-140)$$

wherein ΔH is a melting endotherm (J/g); and (3) having an intrinsic viscosity [η] of 1 to 3 dl/g as measured at 135° C. in tetralin.

The propylene polymer [A] satisfying the above requirements are capable of being calendered and injection-molded at a low temperature, thereby enabling the production of the polypropylene-based calendered or injection-molded article of the present invention which is less tacky and excellent in flexibility and transparency.

The content H25 of 25° C. hexane soluble of the propylene polymer [A] used in the present invention is 0 to 80% by weight, preferably 0 to 50% by weight, more preferably 0 to 25% by weight. H25 is an index showing a content of so-called tacky components that is responsible for the tackiness and the deterioration of transparency. A higher H25 means a larger content of the tacky components. When H25 exceeds 80% by weight, the calendered or injection-molded article tends to be deteriorated in transparency because of a large content of tacky components.

The H25 is a weight reduction rate calculated from the following formula:

$$H25 = [(W_0 - W_1)/W_0] \times 100 (\%)$$

wherein $W_0$ is an initial weight of the propylene polymer [A]; and $W_1$ is a weight of a dried propylene polymer [A] after immersed in 200 mL of hexane at 25° C. for 3 days or longer.

Further, the propylene polymer [A] used in the present invention shows, when measurable by DSC, no melting point or a melting point Tm (° C.) satisfying the following relationship with the melting endotherm ΔH (J/g) represented by the following formula:

$$\Delta H \geq 6 \times (Tm-140)$$

preferably, $\Delta H \geq 3 \times (Tm-120)$ more preferably, $\Delta H \geq 2 \times (Tm-100)$.

Tm and ΔH are determined by the same DSC measuring method as described above. Namely, by using a differential scanning colorimeter ("DSC-7" available from Perkin-Elmer Corp.), 10 mg of a sample was melted by heating at 230° C. for 3 min in nitrogen atmosphere, and then cooled to 0° C. at a rate of 10° C./min. The cooled sample was allowed to stand at 0° C. for 3 min, and then heated at a temperature rise rate of 10° C./min to obtain a melting endotherm. The peak top of the maximum peak in the melting endotherm curve is the melting point Tm, and the melting endotherm during the melting is ΔH (J/g).

The propylene polymer [A] used in the present invention also has an intrinsic viscosity [η] of 1 to 3 dl/g, preferably 1 to 2.5 dl/g, more preferably 1.5 to 2.0 dl/g as measured at 135° C. in tetralin. When the intrinsic viscosity is less than 1 dl/g, the polymer becomes sticky. When the intrinsic viscosity exceeds 3 dl/g, the polymer has a poor moldability due to deteriorated fluidity.

Further, the propylene polymer [A] used in the present invention preferably has a molecular weight distribution (Mw/Mn) of 2.5 to 4.0, more preferably 2.5 to 3.5, most preferably 2.5 to 3.0 as measured by gel permeation chromatography (GPC). When the molecular weight distribution (Mw/Mn) is less than 2.5, the polymer is deteriorated in moldability. When exceeding 4.0, the polymer tends to become sticky. The apparatus and measuring conditions for GPC will be described in Examples below.

Any propylene polymers satisfying the above requirements may be suitably used as the propylene polymer [A] in the present invention. Examples thereof include propylene homopolymer and copolymers of propylene with ethylene and/or $C_4$–$C_{20}$ ρ-olefin with propylene homopolymer being preferred.

The propylene homopolymer is specifically a propylene homopolymer [A-1] having the following characteristics (1) and (2):

(1) a meso pentad fraction [mmmm] of from 20 to 80 mol %; and (2) a racemic pentad fraction [rrrr] satisfying, together with 1–[mmmm], the following formula:

$$[rrrr]/(1-[mmmm])\leq 0.1.$$

By using the propylene homopolymer [A-1] satisfying the above requirements, the calendered or injection-molded article of the present invention which is less tacky and excellent in flexibility and transparency can be obtained.

The meso pentad fraction [mmmm] described herein means a meso fraction in pentad units in polypropylene molecular chain as measured using methyl signals in $^{13}$C-NMR spectra according to the method proposed by A. Zambeili et al., "Macromolecules", 6, 925 (1973). The larger value of the meso pentad fraction means a higher stereoregularity. The meso pentad fraction [mmmm] of the propylene homopolymer [A-1] used in the present invention is preferably 30 to 70 mol %, more preferably 40 to 70 mol %, most preferably 60 to 70 mol %. When the meso pentad fraction [mmmm] is less than 20 mol %, the polymer tends to become sticky. When the meso pentad fraction [mmmm] exceeds 80 mol %, the elastic modulus becomes high to cause a problem in some cases. The racemic pentad fraction [rrrr] means a racemic fraction in pentad units in polypropylene molecular chain. The value of [rrrr]/(1–[mmmm]) is determined from the above fractions in pentad units, and is an index indicating uniformity of the regularity distribution of the propylene homopolymer [A-1]. When the value becomes lager, the regularity distribution is broadened to give a polymer comprising a mixture of a high-stereoregular polypropylene and an amorphous polypropylene as in the case of a conventional polypropylene produced in the presence of a known catalyst system, thereby causing a shaped article to have an increased tackiness and a reduced transparency. The value of [rrrr]/(1–[mmmm]) of the propylene homopolymer [A-1] used in the present invention is preferably 0.08 or less, more preferably 0.06 or less, most preferably 0.05 or less. When the value of [rrrr]/(1–[mmmm]) exceeds 0.1, the polymer tends to become sticky. The meso and racemic fractions in pentad units may be measured by the method as described in Examples below.

When a shaped article having a higher flexibility is intended, the pentad fraction [rmrm] of the propylene homopolymer [A-1] is preferably more than 2.5 mol %, more preferably more than 2.5 mol % but 50 mol % or less, most preferably more than 2.5 mol % but 10 mol % or less. In addition, the meso triad fraction (mm), the racemic triad fraction (rr) and the triad fraction (mr) are preferably in correlation with each other by the formula:

$$(mm)\times(rr)/(mr)^2 < 2.0,$$

more preferably, by the formula:

$$(mm)\times(rr)/(mr)^2 \leq 1.6,$$

most preferably, by the formula:

$$(mm)\times(rr)/(mr)^2 \leq 1.4.$$

Further, the propylene homopolymer [A-1] used in the present invention preferably has a molecular weight distribution (Mw/Mn) of 1.5 to 4.0, more preferably 1.5 to 3.5, most preferably 1.5 to 3.0 as measured by gel permeation chromatography (GPC). When the molecular weight distribution is less than 1.5, the polymer is deteriorated in moldability. When the molecular weight distribution exceeds 4.0, the polymer tends to become sticky.

In general, the polymerization of propylene usually proceeds by so-called t1,2-insertion in which the carbon atom located on the methylene side of a propylene monomer is bonded to the active site of a catalyst and propylene monomers are sequentially coordinated in the same manner to cause polymerization. However, 2,1-insertion or 1,3-insertion (abnormal insertion) rarely occurs. In the propylene homopolymer [A-1] used in the present invention, it is preferred that the 2,1-insertion or 1,3-insertion is minimized. Further, the ratio of these insertions is preferred to satisfy the relationship represented by the following formula (1):

$$[(m\text{-}2,1)+(r\text{-}2,1)+(1,3)]<5.0\ (\%) \quad (1)$$

wherein (m-2,1) is a content (%) of meso 2,1-insertion as measured by $^{13}$C-NMR; (r-2,1) is a content (%) of racemic 2,1-insertion as measured by $^{13}$C-NMR; and (1,3) is a content (%) of 1,3-insertion as measured by $^{13}$C-NMR, more preferably by the following formula (2):

$$[(m\text{-}2,1)+(r\text{-}2,1)+(1,3)]\geq 1.0\ (\%) \quad (2), \text{and}$$

most preferably by the following formula (3):

$$[(m\text{-}2,1)+(r\text{-}2,1)+(1,3)]\geq 0.1\ (\%) \quad (3).$$

A polymer not satisfying the formula (1), in some cases, may be deteriorated in crystallinity more than expected to cause tackiness.

The insertion contents (m-2,1), (r-2,1) and (1,3) are calculated from integral intensities of respective peaks of $^{13}$C-NMR spectra which are assigned to the respective insertions according to the method reported in Grassi, et al., "Macromolecules", 21, p. 617 (1988) and Busico, et al., "Macromolecules", 27, p. 7538 (1994). Namely, (m-2,1) is a meso 2,1-insertion content (%) calculated from a ratio of the integral intensity of the Pα,γ threo peak at around 17.2 ppm to the integral intensity of a whole methyl carbon region. The content (r-2,1) is a racemic 2,1-insertion content (%) calculated from a ratio of the integral intensity of the Pa,y threo peak at around 15.0 ppm to the integral intensity of a whole methyl carbon region. The content (1,3) is a 1,3-insertion content (%) calculated from a ratio of the integral intensity of the Tβ,γ+ peak at around 31.0 ppm to the integral intensity of a whole methyl carbon region.

Further, it is more preferred that the propylene homopolymer [A-1] used in the present invention shows substantially no peak attributable to a molecular chain end derived from the 2,1-insertion (n-butyl) when measured by $^{13}$C-NMR. With respect to the molecular chain end that is derived from the 2,1-insertion, the respective insertion contents are calculated from the integral intensities of peaks of $^{13}$C-NMR spectra which are assigned to the respective insertions according to the method reported in Jungling, et al., "J. Polym. Sci.: Part A: Polym. Chem.", 33, p. 1305 (1995). In case of isotactic polypropylene, the peak appearing near 18.9 ppm is assigned to the end methyl carbon of butyl.

The propylene homopolymer [A-1] used in the present invention may contain, as a copolymer, a small amount of ethylene and/or $C_4$–$C_{20}$ α-olefin. Examples of $C_4$–$C_{20}$ α-olefins include 1-butene, 1-pentene, 4-methyl-1-pentene, 1-hexene, 1-octene, 1-decene, 1-dodecene, 1-tetradecene, 1-hexadecene, 1-octadecene, and 1-eicocene. These olefins may be used alone or in combination of two or more.

The propylene polymer [A] used in the present invention is preferably produced by polymerizing propylene, or polymerizing propylene with ethylene and/or $C_4$–$C_{20}$ α-olefin, in the presence of a polymerization catalyst comprising:

(A) a transition metal compound represented by the following general formula (I):

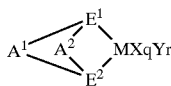

(I)

wherein M is a metal element of Groups 3 to 10 or lanthanum series of the Period Table;

$E^1$ and $E^2$ are the same or different and each independently is a ligand selected from the group consisting of substituted cyclopentadienyl, indenyl, substituted indenyl, heterocyclopentadienyl, substituted heterocyclopentadienyl, amido, phosphide, hydrocarbyl and silicon-containing group; and $E^1$ and $E^2$ are cross-linked via $A^1$ and $A^2$;

X is a Γ-bonding ligand; and a plurality of X, if any, may be same or different and each X may be cross-linked with another X, $E^1$, $E^2$ or Y;

Y is a Lewis base; and a plurality of Y, if any, may be same or different and each Y may be cross-linked with another Y, $E^1$, $E^2$ or X;

$A^1$ and $A^2$ may be the same or different divalent group for cross-linking two ligands $E^1$ and $E^2$ and each independently is $C_1$–$C_{20}$ hydrocarbyl, $C_1$–$C_{20}$ halogen-containing hydrocarbyl, silicon-containing group, germanium-containing group, tin-containing group, —O—, —CO—, —S—, —SO$_2$—, —Se—, —NR—, —PR—, —P(O)R—, —BR— or —AlR— wherein R is hydrogen, halogen, $C_1$–$C_{20}$ hydrocarbyl or $C_1$–$C_{20}$ halogen-containing hydrocarbyl;

q is an integer of 1 to 5 given by the formula, [(valence of M)–2]; and r is an integer of 0 to 3, and (B) at least one component selected from the group consisting of a compound (B-1) capable of forming an ionic complex by reacting with said transition metal compound (A) or a derivative thereof, and an aluminoxane (B-2).

In the above general formula (I), M represents a metal element belonging to Groups 3 to 10 or lanthanum series of the Period Table. Specific examples of the metal elements include titanium, zirconium, hafnium, yttrium, vanadium, chromium, manganese, nickel, cobalt, palladium and lanthanoid metals. Of these metal elements, preferred are titanium, zirconium and hafnium in view of the activity to olefin polymerization.

$E^1$ and $E^2$ form a cross-linked structure via $A^1$ and $A^2$ and each independently is a ligand selected from the group consisting of substituted cyclopentadienyl, indenyl, substituted indenyl, heterocyclopentadienyl, substituted heterocyclopentadienyl, amido (—N<), phosphide (—P<), π-bonding hydrocarbyl (>CR$^1$—, >C<) and silicon-containing group (>SiR$^1$—, >Si<) wherein $R^1$ is hydrogen, $C_1$–$C_{20}$ hydrocarbyl or hetero atom-containing group. Examples of π-bonding hydrocarbyl (>CR$^1$—, >C<) include pentadienyl and boratabenzenyl. Examples of silicon-containing group (>SiR$^1$—, >Si<) include —CH$_2$—Si(CH$_3$)< and —Si(CH)<. The ligands $E^1$ and $E^2$ may be same or different from each other. Of these ligands, preferred are substituted cyclopentadienyl, indenyl and substituted indenyl.

X represents a σ-bonding ligand. A plurality of X, if any, may be same or different, and may be cross-linked with another X, $E^1$, $E^2$ or Y. Examples of the ligand X include halogen, $C_1$–$C_{20}$ hydrocarbyl, $C_1$–$C_{20}$ alkoxy, $C_6$–$C_{20}$ arylalkoxy, a $C_1$–$C_{20}$ amide, $C_1$–$C_{20}$ silicon-containing group, $C_1$–$C_{20}$ phosphide, a $C_1$–$C_{20}$ sulfide, $C_1$–$C_{20}$ sulfoxide and $C_1$–$C_{20}$ acyl.

Examples of halogen include chlorine, fluorine, bromine and iodine. Examples of $C_1$–$C_{20}$ hydrocarbyl include alkyl such as methyl, ethyl, propyl, butyl, hexyl, cyclohexyl and octyl; alkenyl such as vinyl, propenyl and cyclohexenyl; arylalkyl such as benzyl, phenylethyl and phenylpropyl; and aryl such as phenyl, tolyl, dimethylphenyl, trimethylphenyl, ethylphenyl, propylphenyl, biphenyl, naphthyl, methylnaphthyl, anthracenyl and phenathryl. Of the above, preferred are alkyl such as methyl, ethyl and propyl, and aryl such as phenyl. Examples of $C_1$–$C_{20}$ alkoxy include alkyloxy such as methoxy, ethoxy, propoxy and butoxy; and arylalkyloxy such as phenylmethoxy and phenylethoxy. Examples of $C_6$–C20 arylalkoxy include phenoxy, methylphenoxy and dimethylphenoxy. Examples of $C_1$–$C_{20}$ amido include alkylamido such as dimethylamido, diethylamido, dipropylamido, dibutylamido, dicyclohexylamido and methylethylamido; arylalkylamido such as dibenzylamido, phenylehtylamido and phenylpropylamido; alkenylamido such as divinylamido, dipropenylamido and dicyclohexenylamido; arylalkylamido such as dibenzylamido, phenylethylamido and phenylpropylamido; and arylamido such as diphenylamido and dinaphthylamido. Examples of $C_1$–$C_{20}$ silicon-containing group include monohydrocarbylsilyl such as methylsilyl and phenylsilyl; dihydrocarbylsilyl such as dimethylsilyl and diphenylsilyl; trihydrocarbylsilyl such as trimethylsilyl, triethylsilyl, tripropylsilyl, tricyclohexylsilyl, triphenylsilyl, dimethylphenylsilyl, methyldiphenylsilyl, tritolylsilyl and trinaphthylsilyl; hydrocarbylsilyl ether such as trimethylsilyl ether; silicon-substituted alkyl such as trimethylsilylmethyl;

and silicon-substituted aryl such as trimethylsilylphenyl. Of these silicon-containing groups, preferred are trimethylsilylmethyl and phenyldimethylsilylethyl. Examples of $C_1$–$C_{20}$ phosphide include alkylphosphide such as methylphosphide, ethylphosphide, propylphosphide, butylphosphide, cyclohexylphosphide, hexylphosphide and octylphosphide; alkenylphosphide such as vinylphosphide, benzylphosphide and propenylphosphide; and aryl phosphide such as phenylphosphide. Examples of $C_1$–$C_{20}$ sulfide include alkylsulfide such as methylsulfide, ethylsulfide, propylsulfide, butylsulfide, hexylsulfide, cyclohexylsulfiede and octylsulfide; alkenylsulfide such as vinylsulfide, propenylsulfide and cyclohexenylsulfide; arylalkylsulfide such as benzylsulfide, phenylethylsulfide and phenylpropylsulfide; and arylsulfide such as phenylsulfide, tolylsulfide, dimethylphenylsulfide, trimethylphenylsulfide, ethylphenylsulfide, propylphenylsulfide, biphenylsulfide, naphthylsulfide, methylnaphthylsulfide, anthracenylsulfide and phenanthrylsulfide. Examples of $C_1$–$C_{20}$ sulfoxide include alkylsulfoxide such as methylsulfoxide, ethylsulfoxide, propylsulfoxide, butylsulfoxide, hexylsulfoxide, cyclohexysulfoxide and octylsulfoxide; alkenylsulfoxide such as vinylsulfoxide, propenylsulfoxide and cyclohexenylsulfoxide; arylalkylsulfoxide such as benzylsulfoxide, phenylethylsulfoxide and phenylpropylsulfoxide; and arylsulfoxide such as phenylsulfoxide, tolylsulfoxide, dimethylphenylsulfoxide, trimethylphenylsulfoxide, ethylphenylsulfoxide, propylphenylsulfoxide, biphenylsulfoxide, naphthylsulfoxide, methylnaphthylsulfoxide, anthracenylsulfoxide and phenathrylsulfoxide. Examples of $C_1$–$C_{20}$ acyl include alkylacyl such as formyl, acetyl, propionyl, butyryl, valeryl, palmitoyl, stearoyl and oleyl; arylacyl such as benzoyl, toluoyl, salicyloyl, cinnamoyl, naphthoyl and phthaloyl; and oxalyl, malonyl and succinyl derived from dicarboxylic acids such as oxalic acid, malonic acid and succinic acid.

Y represents a Lewis base. A plurality of Y, if nay, may be the same or different, and maybe cross-linked with another Y, $E^1$, $E^2$ or X. The Lewis base may be amine, ether, phosphine and thioether.

The amine may be $C_1$–$C_{20}$ amine exemplified by alkylamines such as methylamine, ethylamine, propylamine, butylamine, cyclohexylamine, methylethylamine, dimethylamine, diethylamine, dipropylamine, dibutylamine, dicyclohexylamine and methylethylamine; alkenylamines such as vinylamine, propenylamine, cyclohexenylamine, divinylamine, dipropenylamine and dicyclohexenylamine; arylalkylamines such as phenylmethylamine, phenylethylamine and phenylpropylamine; and arylamines such as diphenylamine and dinaphthylamine. Examples of the ethers include aliphatic simple ethers such as methyl ether, ethyl ether, propyl ether, isopropyl ether, butyl ether, isobutyl ether, n-amyl ether and isoamyl ether; aliphatic mixed ethers such as methyl ethyl ether, methyl propyl ether, methyl isopropyl ether, methyl n-amyl ether, methyl isoamyl ether, ethyl propyl ether, ethyl isopropyl ether, ethyl butyl ether, ethyl isobutyl ether, ethyl n-amyl ether and ethyl isoamyl ether; aliphatic unsaturated ethers such as vinyl ether, allyl ether, methyl vinyl ether, methyl allyl ether, ethyl vinyl ether and ethyl allyl ether; aromatic ethers such as anisole, phenetole, phenyl ether, benzyl ether, phenyl benzyl ether, ax-naphthyl ether and 0-naphthyl ether; and cyclic ethers such as ethylene oxide, propylene oxide, trimethylene oxide, tetrahydrofuran, and dioxane. The phosphines may be ($C_1$–$C_{20}$ alkyl)phosphines, alkenylphosphines, (arylalkyl) phosphines, arylalkylphosphines and aromatic phosphines. Examples of alkylphosphines include monohydrocarbylphosphines such as methylphosphine, ethylphosphine, propylphosphine, butylphosphine, hexylphosphine, cyclohexylphosphine and octylphosphine; dihydrocarbylphosphines such as dimethylphosphine, diethylphosphine, dipropylphosphine, dibutylphosphine, dihexylphosphine, dicyclohexylphosphine and dioctylphosphine; and trihydrocarbylphosphines such as trimethylphosphine, triethylphosphine, tripropylphosphine, tributylphosphine, trihexylphosphine, tricyclohexylphosphine and trioctylphosphine. Examples of alkenylphosphines include monoalkenylphosphines such as vinyl phosphine, propenyl phosphine and cyclohexenyl phosphine; dialkenylphosphines in which two hydrogen atoms of phosphine are replaced by alkenyl groups; and trialkenylphosphines in which three hydrogen atoms of phosphine are replaced by alkenyl groups. Examples of (arylalkyl)phosphines include benzylphosphine, (phenylethyl)phosphine and (phenylpropyl)phosphine. Examples of arylalkylphosphines include diarylalkylphosphine and aryldialkylphosphine in which three hydrogen atoms of phosphine are replaced by three of aryl and alkyl. Examples of aromaticphosphines include arylphosphines such as phenylphosphine, tolylphosphine, dimethylphenylphosphine, trimethylphenylphosphine, ethylphenylphosphine, propylphenylphosphine, biphenylphosphine, naphthylphosphine, methylnaphthylphosphine, anthracenyl phosphine and phenathryl phosphine; di(alkylaryl) phosphines in which two hydrogen atoms of phosphine are replaced by alkylaryl groups; and tri(alkylaryl)phosphines in which three hydrogen atoms of phosphine are replaced by alkylaryl groups. As thioethers, the sulfides mentioned above may be used.

$A^1$ and $A^2$ are divalent groups for cross-linking two ligands, and may be the same or different from each other. $A^1$ and $A^2$ are each independently $C_1$–$C_{20}$ hydrocarbyl, $C_1$–$C_{20}$ halogen-containing hydrocarbyl, silicon-containing group, germanium-containing group, tin-containing group, —O—, —CO—, —S—, —SO$_2$—, —Se—, —NR—, —PR—, —P(O)R—, —BR— or —AlR—wherein R is hydrogen, halogen, $C_1$–$C_{20}$ hydrocarbyl or $C_1$–$C_{20}$ halogen-containing hydrocarbyl. Examples of the cross-linking groups include ethylene, 1,2-cyclohexylene, dimethylsilylene, diphenylsilylene, methylphenylsilylene, dimethylgermylene, dimethylstannylene, tetramethyldisilylene, diphenyldisilylene and divalent groups represented by the following general formula:

wherein $R^2$ and $R^3$ may be same or different and each independently is hydrogen or $C_1$–$C_{20}$ hydrocarbyl; $R^2$ and $R^3$ may be bonded to each other to form a ring; and e is an integer of 1 to 4.

Examples of the cross-linking groups represented by the above formula include methylene, ethylidene, propylidene, isopropylidene, cyclohexylidene and vinylidene ($CH_2$=C=). Of these cross-linking groups, preferred are ethylene, isopropylidene and dimethylsilylene.

The suffix q is an integer of 1 to 5 given by the formula, [(valence of M)−2], and the suffix r is an integer of 0 to 3.

In the transition metal compounds represented by the general formula (I), when $E^1$ and $E^2$ are substituted cyclopentadienyl, indenyl or substituted indenyl, the cross-linking groups $A^1$ and $A^2$ preferably form (1,2') (2,1') double bridge. Of the transition metal compounds of the general formula (I) having such a structure, preferred are those having, as a ligand, a doubly bridged biscyclopentadienyl derivative represented by the following formula (I-a):

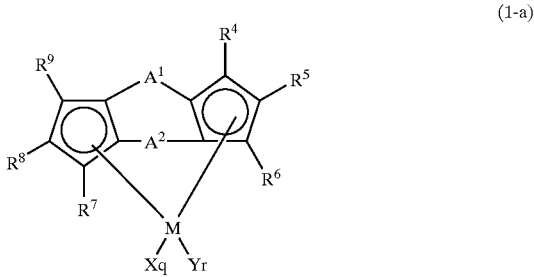

(I-a)

In the formula (I-a), M, $A^1$, $A^2$, q and r are the same as defined above. X is a σ-bonding ligand, and a plurality of X, if any, may be the same or different and may be cross-linked with another X group or Y. Examples of X are the same as exemplified above with respect to X of the general formula (I). Y is a Lewis base, and a plurality of Y, if any, may be the same or different and may be cross-linked with another Y or X. Examples of Y are the same as exemplified above with respect to Y of the general formula (I). $R^4$ to $R^9$ are each independently hydrogen, halogen, $C_1$–$C_{20}$ hydrocarbyl, $C_1$–$C_{20}$ halogen-containing hydrocarbyl, silicon-containing group or hetero atom-containing group, with the proviso that, at least one of $R^4$ to $R^9$ is required to be other than hydrogen. $R^4$ to $R^9$ may be the same or different, and adjacent pair may be bonded to each other to form a ring. In particular, $R^5$ and $R^6$ as well as $R^8$ and $R^9$ are preferably bonded to each other to form a ring. More preferably, each pair forms indenyl group together with cyclopentadienyl to which each pair is attached. $R^4$ and $R^7$ are each preferably a group having a hetero atom such as oxygen, halogen and silicon, because the polymerization activity is enhanced.

The doubly bridged biscyclopentadienyl ligand of the transition metal compound is preferred to be (1,2') (2,1') double bridge.

Examples of the transition metal compounds represented by the general formula (I) include (1,2'-ethylene)(2,1'-ethylene)-bis(indenyl)zirconium dichloride, (1,2'-methylene)(2,1'-methylene)-bis(indenyl)zirconium dichloride, (1,2'-isopropylidene)(2,1'-isopropylidene)-bis(indenyl)zirconium dichloride, (1,2'-ethylene)(2,1'-ethylene)-bis(3-methylindenyl)zirconium dichloride, (1,2'-ethylene)(2,1'-ethylene)-bis(4,5-benzoindenyl)zirconium dichloride, (1,2'-ethylene)(2,1'-ethylene)-bis(4-isopropylindenyl)zirconium dichloride, (1,2'-ethylene)(2,1'-ethylene)-bis(5,6-dimethylindenyl)zirconium dichloride, (1,2'-ethylene)(2,1'-ethylene)-bis(4,7-diisopropylindenyl)zirconium dichloride, (1,2'-ethylene)(2,1'-ethylene)-bis(4-phenylindenyl)zirconium dichloride, (1,2'-ethylene)(2,1'-ethylene)-bis(3-methyl-4-isopropylindenyl)zirconium dichloride, (1,2'-ethylene)(2,1'-ethylene)-bis(5,6-benzoindenyl)zirconium dichloride, (1,2'-ethylene)(2,1'-isopropylidene)-bis(indenyl)zirconium dichloride, (1,2'-methylene)(2,1'-ethylene)-bis(indenyl)zirconium dichloride, (1,2'-methylene)(2,1'-isopropylidene)-bis(indenyl)zirconium dichloride, (1,2'-dimethylsilylene)(2,1'-dimethylsilylene)-bis(indenyl)zirconium dichloride, (1,2'-dimethylsilylene)(2,1'-dimethylsilylene)-bis(3-methylindenyl)zirconium dichloride, (1,2'-dimethylsilylene)(2,1'-dimethylsilylene)-bis(3-n-butylindenyl)zirconium dichloride, (1,2'-dimethylsilylene)(2,1'-dimethylsilylene)-bis(3-isopropylindenyl)zirconium dichloride, (1,2'-dimethylsilylene)(2,1'-dimethylsilylene)-bis(3-trimethylsilylmethylindenyl)zirconium dichloride, (1,2'-dimethylsilylene)(2,1'-dimethylsilylene)-bis(3-phenylindenyl)zirconium dichloride, (1,2'-dimethylsilylene)(2,1'-dimethylsilylene)-bis(4,5-benzoindenyl)zirconium dichloride, (1,2'-dimethylsilylene)(2,1'-dimethylsilylene)-bis(4-isopropylindenyl)zirconium dichloride, (1,2'-dimethylsilylene)(2,1'-dimethylsilylene)-bis(5,6-dimethylindenyl)zirconium dichloride, (1,2'-dimethylsilylene)(2,1'-dimethylsilylene)-bis(4,7-diisopropylindenyl)zirconium dichloride, (1,2'-dimethylsilylene)(2,1'-dimethylsilylene)-bis(4-phenylindenyl)zirconium dichloride, (1,2'-dimethylsilylene)(2,1'-dimethylsilylene)-bis(3-methyl-4-isopropylindenyl)zirconium dichloride, (1,2'-dimethylsilylene)(2,1'-dimethylsilylene)-bis(5,6-benzoindenyl)zirconium dichloride, (1,2'-dimethylsilylene)(2,1'-isopropylidene)-bis(indenyl)zirconium dichloride, (1,2'-dimethylsilylene)(2,1'-isopropylidene)-bis(3-methylindenyl)zirconium dichloride, (1,2'-dimethylsilylene)(2,1'-isopropylidene)-bis(3-isopropylindenyl)zirconium dichloride, (1,2'-dimethylsilylene)(2,1'-isopropylidene)-bis(3-n-butylindenyl)zirconium dichloride, (1,2'-dimethylsilylene)(2,1'-isopropylidene)-bis(3-trimethylsilylmethylindenyl)zirconium dichloride, (1,2'-dimethylsilylene)(2,1'-isopropylidene)-bis(3-trimethylsilylindenyl)zirconium dichloride, (1,2'-dimethylsilylene)(2,1'-isopropylidene)-bis(3-phenylindenyl)zirconium dichloride, (1,2'-dimethylsilylene)(2,1'-methylene)-bis(indenyl)zirconium dichloride, (1,2'-dimethylsilylene)(2,1'-methylene)-bis(3-methylindenyl)zirconium dichloride, (1,2'-dimethylsilylene)(2,1'-methylene)-bis(3-isopropylindenyl)zirconium dichloride, (1,2'-dimethylsilylene)(2,1'-methylene)-bis(3-n-butylindenyl)zirconium dichloride, (1,2'-dimethylsilylene)(2,1'-methylene)-bis(3-trimethylsilylmethylindenyl) zirconium dichloride, (1,2'-dimethylsilylene)(2,1'-methylene)-bis(3-trimethylsilylindenyl)zirconium dichloride, (1,2'-diphenylsilylene)(2,1'-methylene)-bisndenyl)zirconium dichloride, (1,2'-diphenylsilylene)(2,1'-methylene)-bis(3-methylindenyl)zirconium dichloride, (1,2'-diphenylsilylene)(2,1'-methylene)-bis(3-isopropylindenyl)zirconium dichloride, (1,2'-diphenylsilylene)(2,1'-methylene)-bis(3-n-butylindenyl)zirconium dichloride, (1,2'-diphenylsilylene)(2,1'-methylene)-bis(3-trimethylsilylmethylindenyl)zirconium dichloride, (1,2'-diphenylsilylene)(2,1'-methylene)-bis(3-trimethylsilylindenyl)zirconium dichloride, (1,2'-dimethylsilylene)(2,1'-dimethylsilylene)(3-methylcyclopentadienyl)(3'-methylcyclopentadienyl) zirconium dichloride, (1,2'-dimethylsilylene)(2,1'-isopropylidene)(3-methylcyclopentadienyl)(3'-methylcyclopentadienyl)zirconium dichloride, (1,2'-dimethylsilylene)(2,1'-ethylene)(3-methylcyclopentadienyl)(3'-methylcyclopentadienyl)zirconium dichloride, (1,2'-ethylene)(2,1'-methylene)(3-methylcyclopentadienyl)(3'-methylcyclopentadienyl)zirconium dichloride, (1,2'-ethylene)(2,1'-isopropylidene)(3-methylcyclopentadienyl)(3'-methylcyclopentadienyl)zirconium dichloride, (1,2'-methylene)(2,1'-methylene)(3-methylcyclopentadienyl)(3'-methylcyclopentadienyl)zirconium dichloride, (1,2'-methylene)(2,1'-isopropylidene)(3-methylcyclopentadienyl)(3'-methylcyclopentadienyl)zirconium dichloride, (1,2'-isopropylidene)(2,1'-isopropylidene)(3-methylcyclopentadienyl)(3'-methylcyclopentadienyl) zirconium dichloride, (1,2'-dimethylsilylene) (2,1'-dimethylsilylene)(3,4-dimethylcyclopentadienyl)(3',4'-dimethylcyclopentadienyl)zirconium dichloiide, (1,2'-dimethylsilylene)(2,1'-isopropylidene)(3,4-dimethylcyclopentadienyl)(3',4'-dimethylcyclopentadienyl)

zirconium dichloride, (1,2'-dimethylsilylene)(2,1'-ethylene)(3,4-dimethylcyclopentadienyl)(3',4'-dimethylcyclopentadienyl)zirconium dichloride, (1,2'-ethylene)(2,1'-methylene)(3,4-dimethylcyclopentadienyl)(3',4'-dimethylcyclopentadienyl)zirconium dichloride, (1,2'-ethylene)(2,1'-isopropylidene)(3,4-dimethylcyclopentadienyl)(3',4'-dimethylcyclopentadienyl)zirconium dichloride, (1,2'-methylene)(2,1'-methylene)(3,4-dimethylcyclopentadienyl)(3',4'-dimethylcyclopentadienyl)zirconium dichloride, (1,2'-methylene)(2,1'-isopropylidene)(3,4-dimethylcyclopentadienyl)(3',4'-dimethylcyclopentadienyl)zirconium dichloride, (1,2'-isopropylidene)(2,1'-isopropylidene)(3,4-dimethylcyclopentadienyl)(3',4'-dimethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-isopropylcyclopentadienyl)(3'-methyl-5'-isopropylcyclopentadienyl)zirconium dichloride, (1,2'-dimethylsilylene)(2,1'-dimethylsilylene)(3-methyl-5-n-butylcyclopentadienyl)(3'-methyl-5'-n-butylcyclopentadienyl)zirconium dichloride, (1,2'-dimethylsilylene)(2,1'-dimethylsilylene)(3-methyl-5-phenylcyclopentadienyl)(3'-methyl-5'-phenylcyclopentadienyl)zirconium dichloride, (1,2'-dimethylsilylene)(2,1'-isopropylidene)(3-methyl-5-ethylcyclopentadienyl)(3'-methyl-5'-ethylcyclopentadienyl)zirconium dichloride, (1,2'-dimethylsilylene)(2,1'-isopropylidene)(3-methyl-5-isopropylcyclopentadienyl)(3'-methyl-5'-isopropylcyclopentadienyl)zirconium dichloride, (1,2'-dimethylsilylene)(2,1'-isopropylidene)(3-methyl-5-n-butylcyclopentadienyl)(3'-methyl-5'-n-butylcyclopentadienyl)zirconium dichloride, (1,2'-dimethylsilylene)(2,1'-isopropylidene)(3-methyl-5-phenylcyclopentadienyl)(3'-methyl-5'-phenylcyclopentadienyl)zirconium dichloride, (1,2'-dimethylsilylene)(2,1'-ethylene)(3-methyl-5-ethylcyclopentadienyl)(3'-methyl-5'-ethylcyclopentadienyl)zirconium dichloride, (1,2'-dimethylsilylene)(2,1'-ethylene)(3-methyl-5-isopropylcyclopentadienyl)(3'-methyl-5'-isopropylcyclopentadienyl)zirconium dichloride, (1,2'-dimethylsilylene)(2,1'-ethylene)(3-methyl-5-n-butylcyclopentadienyl)(3'-methyl-5'-n-butylcyclopentadienyl)zirconium dichloride, (1,2'-dimethylsilylene)(2,1'-ethylene)(3-methyl-5-phenylcyclopentadienyl)(3'-methyl-5'-phenylcyclopentadienyl)zirconium dichloride, (1,2'-dimethylsilylene)(2,1'-methylene)(3-methyl-5-ethylcyclopentadienyl)(3'-methyl-5'-ethylcyclopentadienyl)zirconium dichloride, (1,2'-dimethylsilylene)(2,1'-methylene)(3-methyl-5-isopropylcyclopentadienyl)(3'-methyl-5'-isopropylcyclopentadienyl)zirconium dichloride, (1,2'-dimethylsilylene)(2,1'-methylene)(3-methyl-5-n-butylcyclopentadienyl)(3'-methyl-5'-n-butylcyclopentadienyl)zirconium dichloride, (1,2'-dimethylsilylene)(2,1'-methylene)(3-methyl-5-phenylcyclopentadienyl)(3'-methyl-5'-phenylcyclopentadienyl)zirconium dichloride, (1,2'-ethylene)(2,1'-methylene)(3-methyl-5-isopropylcyclopentadienyl)(3'-methyl-5'-isopropylcyclopentadienyl)zirconium dichloride, (1,2'-ethylene)(2,1'-isopropylidene)(3-methyl-5-isopropylcyclopentadienyl)(3'-methyl-5'-isopropylcyclopentadienyl)zirconium replacing zirconium of the above-described compounds with titanium or hafnium, though not limited thereto. Further, similar compounds containing metal elements belonging to the other Groups or lanthanum series may also be involved in the present invention.

As the component (B-1), any compounds can be used as long as they form ionic complex by reacting with the above transition metal compound (A). Suitable compounds are represented by the following general formulae (III) or (IV):

  (III)

  (IV)

In the formulae (III) and (IV), $L^1$ represents a Lewis base. $[Z]^-$ represents a non-coordinating anion $[Z^1]^-$ or $[Z^2]^-$. $[Z^1]^-$ is an anion comprising an element and a plurality of groups bonded to the element, i.e., $[M^4G^1G^2\ldots G^f]^-$ wherein $M^4$ is an element belonging to Groups 5 to 15, preferably Groups 13 to 15 of the Periodic Table; $G^1$ to $G^f$ are each hydrogen, halogen, $C_1$–$C_{20}$ alkyl, $C_2$–$C_{40}$ dialkylamino, $C_1$–$C_{20}$ alkoxy, $C_6$–$C_{20}$ aryl, $C_6$–$C_{20}$ arylalkoxy, $C_7$–$C_{40}$ alkylaryl, $C_7$–$C_{40}$ arylalkyl, $C_1$–$C_{20}$ halogen-substituted hydrocarbyl, $C_1$–$C_{20}$ acylalkoxy, organometalloid or $C_2$–$C_{20}$ hetero atom-containing hydrocarbyl, and two or more of $G^1$ to $G^f$ may be bonded to each other to form a ring; f is an integer given by the formula, [(valence of central metal $M^4$)+1]. $[Z^2]^-$ is a conjugated base of Brønsted acid having a logarithm of reciprocal of acid dissociation constant (pKa) of –10 or lower, a conjugated base of a combination of the Brønsted acid and a Lewis acid, or a conjugated base of an acid generally defined as superstrong acid, and may be coordinated with a Lewis base.

$R^{10}$ is hydrogen, $C_1$–$C_{20}$ alkyl, $C_6$–$C_{20}$ aryl, $C_6$–$C_{20}$ alkylaryl or $C_6$–$C_{20}$ arylalkyl.

$L^2$ is $M^2$, $R^{11}R^{12}M^3$, $R^{13}_3C$ or $R^{14}M^3$ wherein $R^{11}$ and $R^{12}$ are ea cyclopentadienyl, substituted cyclopentadienyl, indenyl or fluorenyl; $R^{13}$ is $C_1$–$C_{20}$ alkyl, aryl, alkylaryl or arylalkyl; $R^{14}$ is a macrocyclic ligand such as tetraphenylporphyrin and phthalocyanine; $M^2$ is an element belonging to Groups 1 to 3, 11 to 13 and 17 of the Periodic Table; and $M^3$ is an element belonging to Groups 7 to 12 of the Periodic Table.

Superscript k represents an ionic valence of $[L^1-R^{10}]$ or $[L^2]$, i.e., an integer of 1 to 3.

Subscript a is an integer of 1 or more satisfying b=k×a.

Examples of $L^1$ include amines such as ammonia, methylamine, aniline, dimethylamine, diethylamine, N-methylaniline, diphenylamine, N,N-dimethylaniline, trimethylamine, triethylamine, tri-n-butylamine, methyldiphenylamine, pyridine, p-bromo-N,N-dimethylaniline and p-nitro-N,N-dimethylaniline; phosphines such as triethylphosphine, triphenylphosphine and diphenylphosphine; thioethers such as tetrahydrothiophene; esters such as ethyl benzoate; and nitriles such as acetonitrile and benzonitrile.

Examples of $R^{10}$ include hydrogen, methyl, ethyl, benzyl, and trityl. Examples of $R^{11}$ and $R^{12}$ include cyclopentadienyl, methylcyclopentadienyl, ethylcyclopentadienyl, and pentamethylcyclopentadienyl. Examples of $R^{13}$ include phenyl, p-tolyl, and p-methoxyphenyl. Examples of $R^{14}$ include tetraphenylporphyrin, phthalocyanine, allyl, and methallyl. Examples of $M^2$ include Li, Na, K, Ag, Cu, Br, I, and $I_3$. Examples of $M^3$ include Mn, Fe, Co, Ni, and Zn.

In $[Z^1]^-$, i.e., $[M^4G^1G^2\ldots G^f]^-$, examples of $M^4$ include B, Al, Si, P, As, and Sb with B and Al being preferred. Examples of $G^1$ to $G^f$ include dialkylamino such as dimethylamino and diethylamino; alkoxy or arylalkoxy such as methoxy, ethoxy, n-butoxy and phenoxy; hydrocarbyl such as methyl, ethyl, n-propyl, isopropyl, n-butyl, isobutyl, n-octyl, n-eicosyl, phenyl, p-tolyl, benzyl, 4-t-butylphenyl and 3,5-dimethylphenyl; halogen such as fluorine, chlorine, bromine and iodine; hetero atom-containing hydrocarbyl such as p-fluorophenyl, 3,5-difluorophenyl, pentachlorophenyl, 3,4,5-trifluorophenyl, pentafluorophenyl, 3,5-bis(trifluoromethyl)phenyl and bis (trimethylsilyl)methyl; and organometalloid such as pentamethylantimony, trimethylsilyl, trimethylgermyl, diphenylarsine, dicyclohexylantimony and diphenylboron.

Examples of the non-coordinating anion, i.e., the conjugated base $[Z^2]^-$ of Brønsted acid having a pKa of −10 or lower or the conjugated base of a combination of the Brønsted acid and a Lewis acid include trifluoromethanesulfonic acid anion $[(CF_3SO_3)^-]$, bis (trifluoromethanesulfonyl)methyl anion, bis (trifluoromethanesulfonyl)benzyl anion, bis (trifluoromethanesulfonyl)amide, perchloric acid anion $[(ClO_4)^-]$, trifluoroacetic acid anion $[(CF_3CO_2)^-]$, hexafluoroantimony anion $[(SbF_6)^-]$, fluorosulfonic acid anion $[(FSO_3)^-]$, chlorosulfonic acid anion $[(ClSO_3)^-]$, fluorosulfonic acid anion/antimony pentafluoride $[(FSO_3/SbF_5)^-]$, fluorosulfonic acid anion/arsenic pentafluoride $[(FSO_3/AsF_5)^-]$, and trifluoromethanesulfonic acid anion/antimony pentafluoride $[(CF_3SO_3/SbF_5)^-]$.

Examples of the ionic compound (B-1) capable of forming an ionic complex by reacting with the transition metal compound (A) include triethylammonium tetraphenylborate, tri-n-butylammonium tetraphenylborate, trimethylammonium tetraphenylborate, tetraethylammonium tetraphenylborate, methyl(tri-n-butyl)ammonium tetraphenylborate, benzyl(tri-n-butyl)ammonium tetraphenylborate, dimethyldiphenylammonium tetraphenylborate, triphenyl(methyl)ammonium tetraphenylborate, trimethylanilinium tetraphenylborate, methylpyridinium tetraphenylborate, benzylpyridinium tetraphenylborate, methyl(2-cyanopyridinium) tetraphenylborate, triethylammonium tetrakis (pentafluorophenyl)borate, tri-n-butylammonium tetrakis (pentafluorophenyl)borate, triphenylammonium tetrakis (pentafluorophenyl)borate, tetra-n-butylammonium tetrakis (pentafluorophenyl)borate, tetraethylammonium tetrakis (pentafluorophenyl)borate, benzyl(tri-n-butyl)ammonium tetrakis(pentafluorophenyl)borate, methyldiphenylammonium tetrakis(pentafluorophenyl)borate, triphenyl(methyl) ammonium tetrakis(pentafluorophenyl)borate, methylanilinium tetrakis(pentafluorophenyl)borate, dimethylanilinium tetrakis(pentafluorophenyl)borate, trimethylanilinium tetrakis(pentafluorophenyl)borate, methylpyridinium tetrakis(pentafluorophenyl)borate, benzylpyridinium tetrakis(pentafluorophenyl)borate, methyl(2-cyanopyridinium)tetrakis(pentafluorophenyl)borate, benzyl (2-cyanopyridinium)tetrakis(pentafluorophenyl)borate, methyl(4-cyanopyridinium)tetrakis(pentafluorophenyl) borate, triphenylphosphonium tetrakis(pentafluorophenyl) borate, dimethylanilinium tetrakis[bis(3,5-di-trifluoromethyl)phenyl]borate, ferrocenium tetraphenylborate, silver tetraphenylborate, trityl tetraphenylborate, tetraphenylporphyrin manganese tetraphenylborate, ferrocenium tetrakis(pentafluorophenyl) borate, (1.1'-dimethylferrocenium)tetrakis (pentafluorophenyl)borate, decamethylferrocenium tetrakis (pentafluorophenyl)borate, silver tetrakis (pentafluorophenyl)borate, trityl tetrakis(pentafluorophenyl) borate, lithium tetrakis(pentafluorophenyl)borate, sodium tetrakis(pentafluorophenyl)borate, tetraphenylporphyrin manganese tetrakis(pentafluorophenyl)borate, silver tetrafluoroborate, silver hexafluorophosphate, silver hexafluoroarsenate, silver perchlorate, silver trifluoroacetate, and silver trifluoromethanesulfonate.

These ionic compounds (B-1) which are capable of forming an ionic complex by reacting with the transition metal compound (A) may be used alone or in combination of two or more.

The aluminoxane (B-2) may be a linear aluminoxane represented by the following general formula (V):

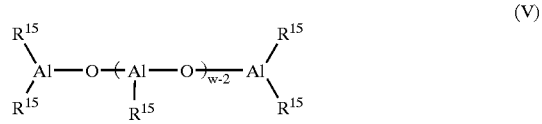

wherein $R^{15}$ is $C_1$–$C_{20}$, preferably $C_1$–$C_{12}$ hydrocarbyl such as alkyl, alkenyl, aryl and arylalkyl or halogen; w is an average polymerization degree, i.e., an integer of usually 2 to 50, preferably 2 to 40; and $R^{15}$ groups may be the same or different, or a cyclic aluminoxane represented by the following general formula (VI):

wherein $R^{15}$ and w are the same as defined above.

The above aluminoxanes may be produced by contacting an alkyl aluminum with a condensing agent such as water. The contact method is not particularly restricted, and may be conducted by any known methods. For example, there may be used:

(1) a method of dissolving an organoaluminum compound in an organic solvent, and then contacting the solution with water;

(2) a method of adding an organoaluminum compound at an initial stage of polymerization, and then adding water at a later stage of polymerization;

(3) a method of reacting crystal water of a metal salt or adsorbed water of an inorganic or organic compound with an organoaluminum compound; and (4) a method of reacting tetraalkyldialuminoxane with an trialkylaluminum, and then with water. The aluminoxanes may be insoluble to toluene.

These aluminoxanes may be used alone or in combination of two or more.

When using the compound (B-1) as the catalyst component (B), the molar ratio of the catalyst component (A) to the catalyst component (B) is preferably 10:1 to 1:100, more preferably 2:1 to 1:10. When out of the above range, the cost performance of the catalyst per unit weight of the polymer is low and therefore not practical. When using the compound (B-2) as the catalyst component (B), the molar ratio of the catalyst component (A) to the catalyst component (B) is preferably 1:1 to 1:1,000,000, more preferably 1:10 to 1:10,000. When out of the above range, the cost performance of the catalyst per unit weight of the polymer is low and therefore not practical. The compounds (B-1) and (B-2) may be used alone or in combination.

The polymerization catalyst used in the present invention may further contain, in addition to the components (A) and (B), an organoaluminum compound as the component (C).

The organoaluminum compound (C) usable in the present invention is represented by the general formula (VII):

$$R^{16}{}_{v}AlJ_{3-v} \quad (VII)$$

wherein $R^{16}$ is $C_1$–$C_{10}$ alkyl; J is hydrogen, $C_1$–$C_{20}$ alkoxy, $C_6$–$C_{20}$ aryl or halogen; v is an integer of 1 to 3.

Examples of the compounds represented by the general formula (VII) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diisobutylaluminum hydride, diethylaluminum hydride, and ethylaluminum sesquichloride.

These organoaluminum compounds may be used alone or in combination of two or more.

In the production method of the present invention, the components (A), (B) and (C) may be preliminarily contacted with each other. The preliminary contact may be performed, for example, by contacting the component (B) with the component (A). The contacting method is not particularly restricted and may be conducted by any known method. The preliminary contact is effective to reduce the catalyst cost because the catalytic activity is improved and the use amount of the co-catalyst component (B) is reduced. By contacting the component (A) with the compound (B-2), an effect, in addition to the above effect, of increasing the molecular weight can be obtained. The preliminary contact is usually carried out at −20 to 200° C., preferably −10 to 150° C., more preferably 0 to 80° C. optionally using a solvent such as inert hydrocarbons, aliphatic hydrocarbons and aromatic hydrocarbons with the aliphatic hydrocarbons being preferred.

The molar ratio of the catalyst component (A) to the catalyst component (C) is preferably 1:1 to 1:10,000, more preferably 1:5 to 1:2,000, still more preferably 1:10 to 1:1,000. The component (C) increases the polymerization activity per unit transition metal. However, an excessively large amount is useless and a large amount of the component (C) remains in the polymer.

In the present invention, at least one of the catalyst components may be carried on a suitable support. The catalyst support usable in the present invention may be, but not limited to, inorganic oxide supports, other inorganic supports and organic supports with the inorganic oxide supports and other inorganic supports being preferred.

Examples of inorganic oxides for the catalyst support include $SiO_2$, $Al_2O_3$, MgO, $ZrO_2$, $TiO_2$, $Fe_2O_3$, $B_2O_3$, CaO, ZnO, BaO, $ThO_2$ and mixtures thereof such as silica alumina, zeolite, ferrite and glass fibers with $SiO_2$ and $Al_2O_3$ being particularly preferred. The inorganic oxide supports may contain a small amount of carbonates, nitrates, sulfates, etc.

As the other support, usable is a magnesium compound or its complex salt, such as $MgCl_2$ and $Mg(OC_2H_5)_2$, represented by the general formula:

$$MgR^{17}{}_{x}X^{1}{}_{y}$$

wherein $R^{17}$ is $C_1$–$C_{20}$ alkyl, $C_1$–$C_{20}$ alkoxy or $C_6$–$C_{20}$ aryl; $X^1$ is a halogen atom or $C_1$–$C_{20}$ alkyl; x is a number of 0 to 2, and y is a number of 0 to 2 with x+y being 2. $R^{17}$ groups or $X^1$ groups may be the same or different, respectively.

Examples of the organic supports include polymers such as polystyrene, styrene-divinylbenzene copolymer, polyethylene, polypropylene, substituted polystyrene and polyarylate, starch, and carbon.

Of the above catalyst supports, preferred are $MgCl_2$, $MgCl(OC_2H_5)$, $Mg(OC_2H_5)_2$, $SiO_2$ and $Al_2O_3$. Although depending upon the type and the production method, the average particle size of the catalyst support is usually 1 to 300 μm, preferably 10 to 200 μm, more preferably 20 to 100 μm.

An excessively small particle size of the catalyst support leads to increase in the amount of fine powder in the polymer, and an excessively large particle size leads to increase in the amount of coarse particles in the polymer to reduce the bulk density of the polymer or clog a hopper.

The specific surface area of the catalyst support is usually 1 to 1,000 m²/g, preferably 50 to 500 m²/g, and the pore volume is usually 0.1 to 5 cm³/g, preferably 0.3 to 3 cm³/g.

When the specific surface area or the pore volume is out of the above range, the catalyst activity tends to be lowered. The specific surface area and the pore volume are determined, for example, from a volume of nitrogen gas absorbed according to BET method (J. Am. Chem. Soc., 60, 309(1983)).

Further, the inorganic oxide support is preferably used after calcined usually at 150 to 1,000° C., preferably 200 to 800° C.

When supporting at least one catalyst component on the catalyst support, at least one, preferably both, of the catalyst components (A) and (B) may be supported thereon.

Although the method for supporting at least one of the catalyst components (A) and (B) is not particularly limited, the supporting may be effected, for example, by:

(1) a method of mixing at least one of the components (A) and (B) with the catalyst support;

(2) a method of mixing a catalyst support treated with an organoaluminum compound or a halogen-containing silicon compound with at least one of the components (A) and (B) in an inert solvent;

(3) a method of reacting the catalyst support and the component (A) and/or the component (B) with an organoaluminum compound or a halogen-containing silicon compound;

(4) a method of mixing a catalyst support that supports one of the component (A) and the component (B) with the other component being not supported;

(5) a method of mixing a contact reaction product of the component (A) and the component (B) with the catalyst support; or (6) a method of contacting the component (A) with the component (B) in the presence of the catalyst support.

The methods (4), (5) and (6) may be carried out in the presence of the organoaluminum compound (C).

The catalyst of the present invention may be prepared by irradiating the components (A), (B) and (C) with an elastic wave during the contact treatment. The elastic wave may be a sound wave, preferably an ultrasonic wave having a frequency of 1 to 1,000 kHz, preferably 10 to 500 kHz.

The catalyst thus obtained may be used for the polymerization in as-produced state or in a solid state after distilling off the solvent.

Alternatively, in the present invention, the catalyst may be directly prepared in the polymerization system by supporting at least one of the component (A) and the component (B) on the catalyst support therein. For example, catalyst particles can be formed by placing at least one of the component (A) and the component (B), the catalyst support and an optional organoaluminum compound (component (C)) in a reactor, and then, pre-polymerizing an olefin such as ethylene at −20 to 200° C. for about one minute to about two hours under ordinary pressure to 2 MPa.

The weight ratio of the compound (B-1) to the catalyst support is preferably 1:5 to 1:10,000, more preferably 1:10 to 1:500, and the weight ratio of the compound (B-2) to the catalyst support is preferably 1:0.5 to 1:1000, more preferably 1:1 to 1:50. When two or more kinds of the component (B) are used, the weight ratio of each component (B) to the catalyst support preferably lies within the above range. The weight ratio of the component (A) to the catalyst support is preferably 1:5 to 1:10,000, more preferably 1:10 to 1:500.

When the weight ratio of the component (B) (compound (B-1) or compound (B-2)) to the catalyst support or the weight ratio of the component (A) to the catalyst support is out of the above range, the catalytic activity tends to be lowered. The average particle size of the polymerization catalyst thus prepared is usually 2 to 200 $\mu$m, preferably 10 to 150 $\mu$m, more preferably 20 to 100 $\mu$m. The specific surface area is usually 20 to 1,000 m$^2$/g, preferably 50 to 500 m$^2$/g. When the average particle size is less than 2 $\mu$m, the amount of fine powder in the polymer tends to be increased. When the average particle size exceeds 200 $\mu$m, the amount of coarse particles in the polymer tends to be increased. When the specific surface area is less than 20 m$^2$/g, the catalytic activity tends to be lowered. When the specific surface area exceeds 1,000 m$^2$/g, the bulk density of the polymer tends to be lowered. The amount of the transition metal in the catalyst is usually 0.05 to 10 g, preferably 0,1 to 2 g based on 100 g of the catalyst support. When out of the above range, the catalytic activity tends to be lowered.

The use of the supported catalyst enables the production of industrially useful polymers having an high bulk density and a desired particle size distribution.

The polymer [A] or [A-1] may be produced by polymerizing propylene, or propylene with ethylene and/or $C_4$–$C_{20}$ $\alpha$-olefin in the presence of the above polymerization catalyst in any polymerization method such as, but not particularly restricted, slurry polymerization, vapor-phase polymerization, bulk polymerization, solution polymerization, and suspension polymerization with slurry polymerization and vapor-phase polymerization being preferred. Examples of $C_4$–$C_{20}$ $\alpha$-olefins include 1-butene, 1-pentene, 4-methyl-1-pentene, 1-hexene, 1-octene, 1-decene, 1-dodecene, 1-tetradecene, 1-hexadecene, 1-octadecene, and 1-eicosene. These $\alpha$-olefins may be used alone or in combination of two or more.

As to the polymerization conditions, the polymerization temperature is usually –100 to 250° C., preferably –50 to 200° C., more preferably 0 to 130° C. The molar ratio of the starting monomer or monomers to the component (A) is preferably 1 to 10$^8$, more preferably 100 to 10$^5$. The polymerization time is usually 5 min to 10 h, and the polymerization reaction pressure is preferably from ordinary pressure to 20 MPa, more preferably from ordinary pressure to 10 MPa.

The molecular weight of the polymer may be controlled by appropriately selecting kinds and amounts of the catalyst components and polymerization temperature, or by polymerizing in the presence of a chain transfer agent such as hydrogen; silane compounds such as phenylsilane and phenyldimethylsilane; and organoaluminum compounds such as trimethyl aluminum with hydrogen being preferred. The addition amount of the chain transfer agent is 10 mol or more, preferably 50 mol or more per one mol of the transition metal in the catalyst.

The polymerization may be carried out using a solvent, for example, aromatic hydrocarbons such as benzene, toluene, xylene and ethyl benzene; alicyclic hydrocarbons such as cyclopentane, cyclohexane and methylcyclohexane; aliphatic hydrocarbons such as pentane, hexane, heptane and octane; and halogenated hydrocarbons such as chloroform and dichloromethane. These solvent may be used alone or in combination of two or more. Also, the monomer such as $\alpha$-olefins may be used as the solvent. In some polymerization methods, polymerization is performed in the absence of a solvent.

Prior to the main polymerization, a pre-polymerization may be conducted using the polymerization catalyst. The pre-polymerization can be carried out, for example, by contacting a small amount of olefins with the solid catalyst component. The contact method is not particularly restricted, and may be any known method. Olefins usable in the pre-polymerization are not particularly restricted, and the same olefins as exemplified above, e.g., ethylene, $C_3$–$C_{20}$ $\alpha$-olefins or mixtures thereof may be used. The olefin used in the pre-polymerization is preferred to be the same as that to be used in the subsequent main polymerization.

The temperature of the pre-polymerization is usually from –20 to 200° C., preferably from –10 to 130° C., more preferably from 0 to 80° C. The pre-polymerization may be carried out using a solvent such as inert hydrocarbons, aliphatic hydrocarbons, aromatic hydrocarbons and monomers with aliphatic hydrocarbons being preferred. Alternatively, the pre-polymerization may be conducted in the absence of a solvent.

The pre-polymerization conditions are preferably controlled such that the resultant prepolymerization product has an intrinsic viscosity [$\eta$] of 0.2 dl/g or higher, preferably 0.5 dl/g or higher when measured at 135° C. in tetralin, and the yield thereof is 1 to 10,000 g, preferably 10 to 1,000 g per 1 mmol of the transition metal in the catalyst.

The propylene polymer [A] or the propylene homopolymer [A-1] may be calendered or injection-molded after blended with various additives or fillers, if desired. Examples of the optional additives include nucleating agents, anti-oxidants, neutralizers, slipping agents, anti-blocking agents, anti-fogging agents, and anti-static agents. The fillers usable are not particularly restricted, and various known inorganic or organic fillers, such as talc, glass fibers, whiskers, and carbon black, may be used. These additives and fillers may be used alone or in combination of two or more.

The nucleating agents may be high-melting polymers, organic carboxylic acids or metal salts thereof, aromatic sulfonic acids or metal salts thereof, organophosphoric acids or metal salts thereof, dibenzylidenesorbitol or derivatives thereof, partial metal salts of rosin acids, inorganic fine particles, imides, amides, quinacridones, quinones, or mixtures thereof. Examples of the high-melting polymers include polyolefins such as polyethylene and polypropylene; polyvinylcycloalkanes such as polyvinylcyclohexane and polyvinylcyclopentane; syndiotactic polystyrene; poly(3-methylpentene-1); poly(3-methylbutene-1); and polyalkenylsilanes. Examples of the metal salts include aluminum benzoate, aluminum p-tert-butylbenzoate, sodium adipate, sodium thiophenecarboxylate, and sodium pyrrolecarboxylate. Examples of the dibenzylidenesorbitol and its derivatives include dibenzylidenesorbitol, 1,3:2,4-bis(o-3,4-dimethylbenzylidene) sorbitol, 1,3:2,4-bis(o-2,4-dimethylbenzylidene)sorbitol, 1,3:2,4-bis(o-4-ethylbenzylidene sorbitol, 1,3:2,4-bis(o-4-chlorobenzylidene sorbitol, and 1,3:2,4-dibenzylidenesorbitol. The dibenzylidenesorbitol or its derivatives are commercially available as Gelol MD and Gelol MD-LM30 (product names) from New Japan Chemical Co., Ltd. Examples of the partial metal salts of rosin acids include Pinecrystal KM1600, Pinecrystal KM1500 and Pinecrystal KM1300 (product names) available from Arakawa Chemical Industries Ltd. Examples of the inorganic particles include talc, clay, mica, asbestos, glass fibers, glass flakes, glass beads, calcium silicate, montmorillonite, bentonite, graphite, aluminum powder, alumina, silica, diatomaceous earth, titanium oxide, magnesium oxide, pumice stone powder, pumice balloons, aluminum hydroxide, magnesium hydroxide, basic magnesium carbonate, dolomite, calcium sulfate, potassium titanate, barium sulfate, calcium sulfite, and molybdenum sulfide. Examples of the amides include adipic acid dianilide and suberic acid dianilide.

In view of generating little odor, preferably used as the nucleating agent are inorganic fine particles of talc and a metal salt of an organophosphoric acid represented by the following general formula:

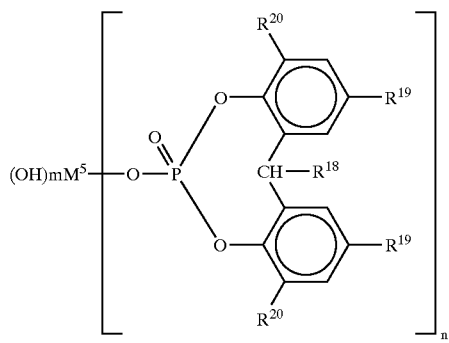

wherein $R^{18}$ is hydrogen or $C_1$–$C_4$ alkyl; $R^{19}$ and $R^{20}$ are each individually hydrogen, $C_1$–$C_{12}$ alkyl, cycloalkyl, aryl or aralkyl; $M^5$ is alkali metal, alkaline earth metal, aluminum or zinc; m is 0 and n is 1 when $M^5$ is alkali metal; n is 1 and m is 1, or n is 2 and m is 0 when $M^5$ is alkaline earth metal or zinc; and m is 1 and n is 2 when $M^5$ is aluminum.

The organophosphoric acid metal salt represented by the above formula is available from Asahi Denka Kogyo K.K. under trade names of Adekastab NA-11 and Adekastab NA-21.

These nucleating agents may be used alone or in combination of two or more.

The addition amount of the nucleating agent is usually 10 ppm or more, preferably 10 to 10,000 ppm, more preferably 10 to 5,000 ppm, still more preferably 10 to 2,500 ppm based on the propylene polymer [A] or the propylene homopolymer [A-1].

The anti-oxidants may be phosphorus anti-oxidants, phenol anti-oxidants and sulfur anti-oxidants.

Examples of the phosphorus anti-oxidants include tris(nonylphenyl) phosphite, tris(2,4-di-tert-butylphenyl) phosphite, distearylpentaerythritol diphosphite, bis(2,4-di-tert-butylphenyl)pentaerythritol phosphite, bis(2,6-di-tert-butyl-4-methylphenyl)pentaerythritol phosphite, 2,2-methylenebis(4,6-di-tert-butylphenyl)octyl phosphite, tetrakis(2,4-di-tert-butylphenyl)-4,4-biphenylene diphosphonite, Adekastab 1178(Asahi Denka Kogyo K.K.), Sumiriser TNP (Sumitomo Chemical Company Ltd.), JP-135 (Johoku Kagaku Co., Ltd.), Adekastab 2112 (Asahi Denka Kogyo K.K.), JPP-2000 (Johoku Kagaku Co., Ltd.), Weston 618 (GE Co., Ltd.), Adekastab PEP-24G (Asahi Denka Kogyo K.K.), Adekastab PEP-36 (Asahi Denka Kogyo K.K.), Adekastab HP-10 (Asahi Denka Kogyo K.K.), P-EPQ (Clarient Corp.), and Irgaphos (Ciba Specialty Chemicals Co., Ltd.).

Examples of the phenol anti-oxidants include 2,6-di-t-butyl-4-methyl phenol, n-octadecyl-3-(3',5'-di-tert-butyl-4'-hydroxyphenyl)propionate, tetrakis[methylene-3-(3,5-di-tert-butyl-4-hydroxyphenyl)propionate]methane, tris(3,5-di-tert-butyl-4-hydroxybenzyl)isocyanurate, 4,4'-butylidenebis-(3-methyl-6-tert-butyl phenol), triethylene glycol-bis[3-(3-tert-butyl-4-hydroxy-5-methylphenyl) propionate], 3,9-bis{2-[3-(3-tert-butyl-4-hydroxy-5-methylphenyl)propionyloxy]-1,1-dimethylethyl}-2,4,8,10-tetraoxaspiro[5.5]undecane, Sumiriser BHT (Sumitomo Chemical Company Ltd.), Yoshinox BHT (Yoshitomi Seiyaku Co., Ltd.), Antage BHT (Kawaguchi Kagaku Co., Ltd.), Irganox 1076 (Ciba Specialty Chemicals Corp.), Irganox 1010 (Ciba Specialty Chemicals Corp.), Adekastab AO-60 (Asahi Denka Kogyo K.K.), Sumiriser BP-101 (Sumitomo Chemical Company Ltd.), Tominox TT (Yoshitomi Seiyaku Co., Ltd.), TTHP (Toray Industries), Irganox 3114 (Ciba Specialty Chemicals Corp.), Adekastab AO-20 (Asahi Denka Kogyo K.K.), Adekastab AO-40 (Asahi Denka Kogyo K.K.), Sumiriser BBM-S (Sumitomo Chemical Company Ltd.), Yoshinox BB (Yoshitomi Seiyaku Co., Ltd.), Antage W-300 (Kawaguchi Kagaku Co., Ltd.), Irganox 245 (Ciba Specialty Chemicals Corp.), Adekastab AO-70 (Asahi Denka Kogyo K.K.), Tominox 917 (Yoshitomi Seiyaku Co., Ltd.), Adekastab AO-80 I(Asahi Denka Kogyo K.K.), and Sumiriser GA-80 (Sumitomo Chemical Company Ltd.).

Examples of the sulfur anti-oxidants include dilauryl-3,3'-thiodipropionate, dimyristyl-3,3'-thiodipropionate, distearyl-3,3'-thiodipropionate, pentaerythritol tetrakis(3-laurylthiopropionate), SUMIRISER TPL (Sumitomo Chemical Company Ltd.), Yoshinox DLTP (Yoshitomi Seiyaku Co., Ltd.), Antiox L (NOF Corporation), Sumiriser TPM (Sumitomo Chemical Company Ltd.), Yoshinox DMTP (Yoshitomi Seiyaku Co., Ltd.), Antiox M (NOF Corporation), Sumiriser TPS (Sumitomo Chemical Company Ltd.), Yoshinox DSTP (Yoshitomi Seiyaku Co., Ltd.), Antiox S (NOF Corporation), Ltd., Adekastab AO-412S (Asahi Denka Kogyo K.K.), Seenox 412S (Sipro Kasei Co., Ltd.), and Sumiriser TDP (Sumitomo Chemical Company Ltd.).

Preferred phenol anti-oxidants are:

Irganox 1010 (pentaerythrityl-tetrakis[3-(3,5-di-tert-butyl-4-hydroxyphenyl)propionate]) available from Ciba Specialty Chemicals Corp.;

Irganox 1076 (octadecyl-3-(3,5-di-tert-butyl-4-hydroxyphenyl)propionate) available from Ciba Specialty Chemicals Corp.;

Irganox 1330 (1,3,5-trimethyl-2,4,6-tris(3,5-di-tert-butyl-4-hydroxybenzyl)benzene) available from Ciba Specialty Chemicals Corp.; and Irganox 3114 (tris(3,5-di-tert-butyl-4-hydroxybenzyl) isocyanurate) available from Ciba Specialty Chemicals Corp.

Preferred phosphorus anti-oxidants are:

Irgaphos 168 (tris(2,4-di-t-butylphenyl)phosphite) available from Ciba Specialty Chemicals Corp.; and P-EPQ (tetrakis(2,4-di-t-butylphenyl)-4,4'-biphenylene diphosphite) available from Clarient Corp.

The amount of the anti-oxidant, when used, is about 0.001 to about 1 part by weight based on 100 parts by weight of the propylene polymer [A] or the propylene homopolymer [A-1]. The addition of the anti-oxidant preferably prevents the yellowing, etc. of the polymer.

As the neutralizers, particularly preferred are calcium stearate, zinc stearate, magnesium stearate, hydrotalcite such as DHT-4A (composition: $Mg_{4.5}Al_2(OH)_{13}CO_3 \cdot 3.5H_2O$) available from Kyowa Kagaku Kogyo Co., Ltd., and lithium-aluminum composite hydroxide such as Mizukalac ($[Li_2Al_4(OH)_{12}]CO_3 \cdot mH_2O$ wherein m is ca. 3) available from Mizusawa Kagaku Kogyo Co., Ltd.

As the anti-blocking agents, particularly preferred are a synthetic silica anti-blocking agent "SAILICIA" available from Fuji Silysia Co., Ltd., and a synthetic silica anti-blocking agent "MIZUKASIL" available from Mizusawa Kagaku Kogyo Co., Ltd.

Particularly preferred slipping agents are erucamide, oleamide, stearamide, behenamide, ethylene bisstearamide, ethylene bisoleamide, stearyl erucamide, and oleyl palmitamide.

The addition amount of each additive is about 0.001 to about 1 part by weight based on 100 parts by weight of the propylene polymer [A] or the propylene homopolymer [A-1]. Examples of the additive formulation are shown below.

Additive Formulation (A)

(1) Anti-oxidant
  1000 ppm of Irganox 1010 available from Ciba Specialty Chemicals Corp., and
  1000 ppm of Irgaphos 168 available from Ciba Specialty Chemicals Corp.: 1,000 ppm;
(2) Neutralizer
  1000 ppm of calcium stearate;
(3) Anti-blocking Agent
  2300 ppm of a silica anti-blocking agent available from Fuji Silysia Co., Ltd.; and
(4) Slipping Agent
  500 ppm of erucamide.

The present invention will be described in more detail by reference to the examples. However, it should be noted that the following examples are only illustrative and not intended to limit the invention thereto.

The resin properties of polymers and the properties of calendered or injection-molded articles were evaluated in the following manners.

Evaluation of Resin Properties of Polymers (1) [η]

The intrinsic viscosity of the polymer was measured at 135° C. in tetralin using an automatic viscometer "VMR-053 Model" available from Rigosha Co., Ltd.

(2) Pentad Fraction, Triad Fraction and Abnormal Insertion

The peaks of $^{13}C$-NMR spectra obtained under the following conditions were assigned according to the method proposed by A. Zambelli, et al., Macromolecules, 8, 687 (1975).

Apparatus: $^{13}C$-NMR spectrometer "JNM-EX400 Model" manufactured by JEOL Ltd.
  Method: complete proton decoupling method
  Concentration: 220 mg/ml
  Solvent: 1,2,4-trichlorobenzene/heavy benzene mixed solvent (90/10 by volume)
  Temperature: 130° C.
  Pulse width: 45° C.
  Pulse interval: 4 s
  Integration: 10,000 times (3) Molecular Weight Distribution (Mw/Mn)

Mw/Mn was calculated from the weight-average molecular weight Mw and the number-average molecular weight Mn which were measured by GPC under the following conditions and calibrated based on polyethylene standard.

GPC Apparatus:
  Column: Toso GMHHR-H(S)HT
  Detector: RI Detector "WATERS 150C" for liquid chromatogram
  Measuring Conditions:
  Solvent: 1,2,4-trichlorobenzene
  Measuring temperature: 145° C.
  Flow rate: 1.0 ml/min
  Sample concentration: 2.2 mg/ml
  Injection amount: 160 $\mu$l
  Calibration curve: Universal Calibration
  Analytic program: HT-GPC (Ver. 10)

(4) DSC Measurement

A differential scanning calorimeter ("DSC-7" available from Perkin Elmer Co., Ltd.) was used. After melting 10 mg sample by heating at 230° C. for 3 min in nitrogen atmosphere, the sample was cooled to 0° C. at a rate of 10° C./min. The cooed sample was kept at 0° C. for 3 min, and then heated at a temperature rise rate of 10° C./min to obtain a melting endotherm curve. The melting endotherm was expressed as ΔH. The peak top of the maximum peak of the melting endotherm curve was taken as the melting point Tm (° C.).

Evaluation of Calendered or Injection-molded Articles (1) Tensile Modulus

Determined according to tensile test of JIS K-7127 under the following conditions:
  Cross-head speed: 50 mm/min
  Load cell: 100 kg
  Measuring direction: machine direction (MD direction)

(2) DSC Measurement

A differential scanning calorimeter ("DSC-7" available from Perkin Elmer Co., Ltd.) was used. After melting 10 mg sample by heating at 230° C. for 3 min in nitrogen atmosphere, the sample was cooled to 0° C. at a rate of 10° C./min. The cooed sample was kept at 0° C. for 3 min, and then heated at a temperature rise rate of 10° C./min to obtain a melting endotherm curve. The peak top of the maximum peak of the melting endotherm curve was taken as the melting point Tm (° C.).

(3) Internal Haze

Evaluated based on the haze value obtained by the testing method of JIS K-7105.

EXAMPLE 1

(1) Preparation of Catalyst

Synthesis of (1,2'-Dimethylsilylene)(2,1'-dimethylsilylene)-bis(3-n-butylindenyl)zirconium Dichloride Into a Schlenk bottle, were charged 0.83 g (2.4 mmol) of (1,2'-dimethylsilylene)(2,1'-dimethylsilylene)-bis(indene) and 50 ml of ether. After the mixture was cooled to −78° C. and then added with 3.1 ml (5.0 mmol) of n-BuLi (as a 1.6 M hexane solution), the mixture was stirred at room temperature for 12 h. Then, the solvent was distilled away to obtain solids, which were washed with 20 ml of hexane to obtain 1.1 g (2.3 mmol) of a lithium salt as ether adduct. The lithium salt was dissolved in 50 ml of THF and cooled to −78° C. Then, the solution was stirred at room temperature for 12 h while slowly dropping 0.57 ml (5.3 mmol) of n-butyl bromide. By following the removal of the solvent by distillation, the extraction with 50 ml of hexane, and the removal of the solvent by distillation, 0.81 g (1.77 mmol) of (1,2'-dimethylsilylene)(2,1'-dimethylsilylene)-bis(3-n-butylindene) was obtained (yield: 74%).

Next, into a Schlenk bottle, were charged 0.81 g (1.77 mmol) of (1,2'-dimethylsilylene)(2,1'-dimethylsilylene)-bis(3-n-butylindene) and 100 ml of ether under nitrogen flow. After the mixture was cooled to −78° C. and added with 2.7 ml (4.15 mmol) of n-BuLi (as a 1.54 M hexane solution), the mixture was stirred at room temperature for 12 h. The solvent was removed by distillation to obtain solids which were washed with hexane, thereby obtaining 0.28 g (1.43 mmol) of a lithium salt as ether adduct.

The lithium salt was dissolved in 50 ml of toluene under nitrogen flow. After the solution was cooled to −78° C., a suspension, which was cooled to −78° C. in advance, of 0.33 g (1.42 mmol) of zirconium tetrachloride in 50 ml of toluene was dropped into the solution. After dropping, the mixture was stirred at room temperature for 6 h and then filtered. The filtrate was distilled to remove the solvent, and the residue was recrystallized from dichloromethane to obtain 0.2 g (0.32 mmol) of (1,2'-dimethylsilylene)(2,1'-dimethylsilylene)-bis(3-n-butylindenyl)zirconium dichloride (yield: 22%).

H-NMR (90 MHz, CDCl): (δ, ppm): 0.88, 0.99 (12H, dimethylsilylene), 0.7–1.0, 1.1–1.5 (18H, n-Bu), 7.0–7.6 (8H, benzene ring proton).

(2) Polymerization of Propylene

Into a 10-L stainless steel autoclave, were charged 6 L of heptane and 6 mmol of triisobutylaluminum, and a catalyst component prepared by pre-contacting 5 mmol of methylaluminoxane (available from Albemarle Corp.) with 5 μmol of (1,2'-dimethylsilylene)(2,1'-dimethylsilylene)-bis(3-n-butylindenyl)zirconium dichloride obtained above in toluene for 5 min. After introducing hydrogen up to 49 kPa (Gauge), a propylene gas was introduced into the autoclave until the total pressure reached 784 kPa (Gauge). Propylene was continuously fed into the autoclave though a pressure controller to maintain the polymerization pressure constant. After continuing the polymerization at 50° C. for 30 min, the reaction mixture was taken out and dried under reduced pressure to obtain a propylene homopolymer.

The resin properties of the powdery propylene homopolymer were examined by the above evaluation methods. After compounding the following additives, the propylene homopolymer was extruded into pellets through a single-screw extruder "TLC 35-20 Model" available from Tsukada Juki Seisakusho Co., Ltd.

Additive Formulation (1) Calcium stearate: 0.1 wt %
(2) 3,5-di-t-butyl-4-hydroxytoluene: 0.1 wt %
(3) tetrakis[methylene(3,5-di-t-butyl-4-hydroxy)hydrocinnamate]methane: 0.1 wt %

The pellets were formed into sheet using a calendering apparatus (twin 3-inch rolls) available from NISHIMURA Co., Ltd. under the conditions of a heating roll temperature of 100° C., a cooling roll temperature of 60° C., and a take-off speed of 40 m/s.

The sheet was subjected to above evaluation for calendered or injection-molded articles. The results are shown in Table 1.

COMPARATIVE EXAMPLE 3

The same procedure as in Example 1 was repeated except that polypropylene produced below was used in place of the propylene homopolymer and the heating roll temperature for calendering was changed to 110° C. The results are shown in Table 1.

(1) Preparation of Catalyst (1-a): Preparation of (1,2'-Ethylene)(2,1'-ethylene)-bis(3-methylindene)

Into 50 ml of dehydrated ether, was dissolved 1.12 g (3.94 mmol) of (1,2'-ethylene)(2,1'-ethylene)-bis(indene) under nitrogen flow. After cooling the solution to −78° C., 5.01 ml of a 1.57 mol/L solution of n-butyllithium in hexane (n-butyliithium: 7.87 mmol) was added dropwise over 30 min, and then, the temperature was raised to room temperature to stir for 8 h. The ether solvent was removed by distillation under reduced pressure and the residue was washed with hexane to obtain 1.12 g (3.02 mmol) of a dilithium salt as ether adduct. The dilithium salt was dissolved in 50 ml of dehydrated tetrahydrofuran, and cooled to −78° C. After adding dropwise 10 ml of a tetrahydrofuran solution containing 0.42 ml (6.74 mmol) of methyl iodide to the solution over 20 min, the temperature was raised to room temperature and the stirring was continued for 8 h. The solvent was removed by distillation under reduced pressure and the residue was extracted with ethyl acetate. The extract was washed with water and the organic phase was dried over anhydrous magnesium sulfate, and then filtered. The filtrate was dried and evaporated to dryness to obtain 0.87 g (2.78 mmol) of the title (1,2'-ethylene)(2,1'-ethylene)-bis(3-methylindene) (yield: 70.5%) as a mixture of isomers on the position of double bond in 5-membered ring.

(1-b): Preparation of Dilithium Salt of (1,2'-Ethylene)(2,1'-ethylene)-bis(3-methylindene)

Into 35 ml of ether, was dissolved 0.87 g (2.78 mmol) of (1,2'-ethylene)(2,1'-ethylene)-bis(3-methylindene) under nitrogen flow. After cooling the solution to −78° C., 3.7 ml of a 1.57 mol/L solution of n-butyllithium in hexane (n-butyllithium: 5.81 mmol) was added dropwise over 30 min, and then, the temperature was raised to room temperature to stir for 8 h. The solvent was removed by distillation under reduced pressure and the residue was washed with hexane to obtain 1.03 g (2.58 mmol) of a dilithium salt as ether adduct (yield: 92.8%).

$^1$H-NMR (THF-d$_8$): (δ, ppm): 2.20 (6H, s), 3.25 (8H, s), 6.0–7.4 (8H, m).

(1-c): Preparation of (1,2'-Ethylene)(2,1'-ethylene)-bis(3-methylindenyl)zirconium Dichloride Into 25 ml of toluene, waw dispersed 1.03 g (2.58 mmol) of the ether adduct of dilithium salt of (1,2'-ethylene)(2,1'-ethylene)-bis(3-methylindene). The suspension was cooled to −78° C. After adding a dispersion of 0.60 g (2.58 mmol) of zirconium tetrachloride in 20 ml of toluene over 20 min, the temperature was raised to room temperature to stir for 8 h. The toluene supernatant was removed by filtration and the residue was extracted with two portions of 50 ml dichloromethane. The solvent was removed by distillation under reduced pressure and the residue was recrystallized from dichloromethane/hexane to obtain 0.21 g of (1,2'-ethylene)(2,1'-ethylene)-bis(3-methylindenyl)zirconium dichloride (yield: 17.3%).

$^1$H-NMR (CDCl$_3$): (δ, ppm): 2.48 (6H, s), 3.33–3.85 (8H, m), 6.9–7 (8H, m).

(2) Polymerization

Into a 10-L stainless steel autoclave, were charged 5 L of heptane, 5 mmol of triisobutylaluminum, and a catalyst component prepared by pre-contacting 19 mmol (in terms of aluminum) of methylaluminoxane available from Albemarle Corp. with 19 μmol of (1,2'-ethylene)(2,1'-ethylene)-bis(3-methylindenyl)zirconium dichloride obtained in Step 1 in toluene for 30 min. The temperature was raised to 40° C., and then a propylene gas was introduced until the total pressure reached 784 kPa (Gauge). Propylene was continuously fed to the autoclave though a pressure controller to maintain the polymerization pressure constant. After one hour, the content of the autoclave was taken out and dried under reduced pressure to obtain polypropylene.

COMPPARATIVE EXAMPLE 1

(1) Preparation of Magnesium Compound

A 6-L glass reactor equipped with a stirrer was fully purged with nitrogen gas, and then charged with about 2,430 g of ethanol, 16 g of iodine and 160 g of metallic magnesium. The mixture was heated under stirring and the reaction was continued under reflux until the generation of hydrogen gas was no longer noticed, thereby obtaining a solid product. The reaction liquid containing the solid product was dried under reduced pressure to obtain a magnesium compound.

(2) Preparation of Solid Catalyst Component (A)

Into a 5-L glass reactor having been fully purged with nitrogen gas, were charged 160 g of the magnesium compound (not ground) prepared in Step 1, 800 ml of purified heptane, 24 ml of silicon tetrachloride, and 23 ml of diethyl phthalate. Then, 770 ml of titanium tetrachloride was added to the mixture with stirring while keeping the mixture at 80° C., and the reaction was allowed to proceed at 110° C. for 2 h. The resulting solid component was separated and washed with purified heptane at 90° C. The reaction was further allowed to proceed by adding 1,220 ml of titanium tetrachloride at 110° C. for 2 h. The product was fully washed with purified heptane to obtain a solid catalyst component (A).

(3) Gas-phase Polymerization

The polymerization was conducted at 70° C. under 2.75 MPa (Gauge) by feeding into a 200-L polymerization reactor the solid catalyst component (A) prepared in Step 2 at a rate of 6.0 g/h, triisobutylaluminum (TDBA) at a rate of 0.2 mol/h, 1-allyl-3,4-dimethoxybenzene (ADMB) at a rate of 0.012 mol/h, cyclohexylmethyldimethoxysilane (CHMDMS) at a rate of 0.012 mol/h, and propylene at a rate of 37 kg/h. The resin properties of the powdery polypropylene thus obtained were evaluated in the same manner as in Example 1. The powdery polypropylene was blended with 2,5-dimethyl-2,5-di-(tert-butylperoxy)-hexane, and then with an antioxidant, a stabilizer and a chlorine scavenger. The resulting blend was extruded into pellets through a 40-mmφ extruder. It was attempted to form the pellets into sheet using a calendering apparatus (twin 3-inch rolls) available from Nishimura Co., Ltd. Since the attempt was failed under the same conditions as in Example 1 and Comparative Example 3, the conditions were changed to a heating roll temperature of 175° C., a cooling roll temperature of 60° C. and a take-off speed of 40 m/min.

The sheet was subjected to above evaluation for calendered or injection-molded articles. The results are shown in Table 1.

TABLE 1

| | | Ex. 1 | Com Ex. 3 | Com. Ex. 1 |
|---|---|---|---|---|
| Resin Properties | | | | |
| H25 | (wt %) | 17 | 0 | 6 |
| [η] | (dl/g) | 2.5 | 1.0 | 2.3 |
| [mmmm] | (mol%) | 41 | 63.5 | 65 |
| [rrrr]/(1-[mmmm]) | | 0.04 | 0.019 | 0.23 |

TABLE 1-continued

| | | Ex. 1 | Com Ex. 3 | Com. Ex. 1 |
|---|---|---|---|---|
| [rmrm] | (mol%) | 3.2 | 1.0 | 1.4 |
| mm × rr/(mr)$^2$ | | 1.2 | 2.5 | 6.1 |
| 2,1-Insertion | (mol%) | 0 | 0 | 0 |
| 1,3-Insertion | (mol%) | 0 | 0 | 0 |
| Mw/Mn | | 2.4 | 2.0 | 2.7 |
| Tm | (° C.) | n.d | 102 | 158.6 |
| 6 × (Tm − 140) | | n.d | −228 | 111.6 |
| ΔH | (J/g) | n.d | 51 | 61 |
| Properties of Sheet | | | | |
| Tensile Modulus (TM) | (MPa) | 40 | 220 | 330 |
| 5 × Tm − 450 | | n.d | 60 | 343 |
| Internal haze | (%) | 4 | 15 | 60 |

Note: n.d.: No melting point Tm was detected

Tensile modulus, haze and transparency were evaluated using a 1-mm thick specimen.

EXAMPLE 3

(1) Preparation of Catalyst

Synthesis of (1,2'-Dimethylsilylene)(2,1'-dimethylsilylene)-bis(3-trimethylsilylmethylindenyl)zirconium Dichloride Into 50 ml of THF placed in a Schlenk bottle, was dissolved 3.0 g (6.97 mmol) of a lithium salt of (1,2'-dimethylsilylene)(2,1'-dimethylsilylene)-bis(indene), and the solution was cooled to −78° C. After slowly dropping 2.1 ml (14.2 mmol) of iodomethyltrimethylsilane, the solution was stirred at room temperature for 12 h. The solvent was removed by distillation and the residue was added with 50 ml of ether, followed by washing with a saturated 15 ammonium chloride solution. By drying the organic phase from a liquid separation and removing the solvent, 3.04 g (5.88 mmol) of (1,2'-dimethylsilylene)(2,1'-dimethylsilylene)-bis(3-trimethylsilylmethylindene) was obtained (yield: 84%). s Then, into a Schlenk bottle, were charged with 3.04 g (5.88 mmol) of (1,2'-dimethylsilylene)(2,1'-dimethylsilylene)-bis(3-trimethylsilylmethylindene) prepared above and 50 ml of ether under a nitrogen flow. The solution was cooled to −78° C., added with 7.6 ml (11.7 mmol) of a 1.54 M solution of n-BuLi in hexane, and then stirred at room temperature for 12 h. After removing the solvent by distillation, the solid product was washed with 40 ml hexane to obtain 3.06 g (5.07 mmol) of a lithium salt as ether adduct (yield: 73%).

$^1$H-NMR (90 MHz, THF-d$_8$): (δ, ppm): 0.04 (s, 18H, trimethylsilyl), 0.48 (s, 12H, dimethylsilylene), 1.10 (t, 6H, methyl), 2.59 (s, 4H, methylene), 3.38 (q, 4H, methylene), 6.2–7.7 (m, 8H, Ar—H)

The lithium salt thus obtained was dissolved into 50 ml of toluene under nitrogen flow. After cooling to −78° C., a suspension, which was cooled to −78° C. in advance, of 1.2 g (5.1 mmol) of zirconium tetrachloride in 20 ml of toluene was added dropwise to the solution. After the dropwise addition, the mixture was stirred at room temperature for 6 h, then the solvent was removed by distillation. The residue was recrystallized from dichloromethane to obtain 0.9 g (1.33 mmol) of (1,2'-dimethylsilylene)(2,1'-dimethylsilylene)-bis(3-trimethylsilylmethylindenyl) zirconium dichloride (yield: 26%).

$^1$H-NMR (90 MHz, CDCl): (δ, ppm): 0.0 (s, 18H, trimethylsilyl), 1.02,1.12 (s, 12H, dimethylsilylene), 2.51 (dd, 4H, methylene), 7.1–7.6 (m, 8H, Ar—H)

(2) Production of Propylene Polymer

The continuous polymerization was conducted at 60° C. under 0.8 MPa by feeding into a 200-L polymerization reactor (1,2'-dimethylsilylene)(2,1'-dimethylsilylene)-bis(3-trimethylsilylmethylindenyl)zirconium dichloride prepared in Step 1 at a rate of 11 μmol/h, tilisobutylaluminum (TIBA) at a rate of 15 mmol/h, methylaluminoxane (MAO) at a rate of 11 mmol/h, heptane at a rate of 30 L/h, propylene at a rate of 8.4 kg/h, and hydrogen at a molar ratio, $H_2$/propylene, of 0.09. The polymer solution was transferred into a deaerator, where methanol was fed into the polymer solution at a rate of 10 ml/h to release propylene gas and hydrogen gas. After adding the following additives, the polypropylene solution was deaerated by heating, and then granulated into pellets by extruding from an extruder.

Additive Formulation

Anti-oxidant

Irganox 1010 available from Ciba Specialty Chemicals Corp.: 500 ppm

Irgaphos 168 available from Ciba Specialty Chemicals Corp.: 1,000 ppm.

(3) Calendering

The pellets were formed into sheet using a calendering apparatus (twin 3-inch rolls) available from Nishimura Co., Ltd. under the conditions of a heating roll temperature of 90° C., a cooling roll temperature of 60° C. and a take-off speed of 40 m/min. The results of the measurement of resin properties 15 and properties of sheet are shown in Table 2.

EXAMPLE 4

A sheet was produced in the same manner as in Example 3 except for using the following additives.

Additive Formulation

Anti-oxidant

Irganox 1010 available from Ciba Specialty Chemicals Corp.: 500 ppm

Irgaphos 168 available from Ciba Specialty Chemicals Corp.: 1,000 ppm Nucleating agent Gelol MD available from New Japan Chemical Co., Ltd.: 2,000 ppm

COMPARATIVE EXAMPLE 4

(1) Preparation of Catalyst

Preparation of 1,2-Ethanediyl(2-indenyl)(1-(2-isopropylindenyl))hafnium Dichloride Into a 100-ml three-necked flask, were charged 20 ml of THF and 1.69 g 30 (9.9 mmol) of 2-isopropylindenyllithium, and the solution was cooled to −78° C. After adding 1.74 ml (10 mmol) of hexamethylphosphoramide, a solution of 20 ml of THF and 2 g (8.96 mmol) of 1-bromo-2-(2-indenyl)ethane was added dropwise from a dropping funnel. After stirring at room temperature for 8 h, 5 ml of water and then 100 ml of ether were added. The organic phase was washed three times with 50 ml of an aqueous copper sulfate solution using a separatory funnel. The solvent was removed by distillation from the separated organic phase, and the residue was purified on a column using a hexane eluent to obtain 2 g of 1-(2-indenyl)-2-(1-(2-isopropylindenyl))ethane.

Then, into a 200-ml Schlenk bottle, were charged 20 ml of diethyl ether and 2 g of 1-(2-indenyl)-2-(1-(2-isopropylindenyl))ethane under nitrogen flow, and the solution was cooled to −78° C. After adding 10 ml of a 1.61 M hexane solution of n-butyl lithium (n-butyl lithium: 16.1 mmol), the mixture was stirred at room temperature for 8 h. Then, the solvent was removed by distillation and the residue was washed with hexane to obtain 2.14 g of a lithium salt of 1-(2-indenyl)-2-(1-(2-isopropylindenyl))ethane.

Then, 10 ml of toluene was added to 1.15 g (3.18 mmol) of the lithium salt and cooled to −78° C. A slurry, cooled to −78° C. in advance, of 1.02 g (3.18 mmol) of hafnium tetrachloride in 10 ml of toluene was added to the lithium salt of 1-(2-indenyl)-2-(1-(2-isopropylindenyl))ethane through a cannula. The mixture was stirred at room temperature for 8 h and filtered to separate a supernatant. The filtrate was concentrated and then recrystallized from a methylene chloride/hexane mixed solvent to obtain 0.45 g (0.83 mmol) of 1,2-ethanediyl(2-indenyl)(1-(2-isopropylindenyl))hafnium dichloride.

1H-NMR: (δ, ppm): 7.8–7.0 (m, 8H), 6.50 (s, 1H), 5.92 (d, 1H), 3.65 (s, 4H), 3.30 (m 1H), 1.50 (d, 3H), 1.25 (d, 3H).

(2) Production of Propylene Polymer

After thoroughly vacuum-drying a 1-L stainless steel pressure autoclave equipped with a stirrer at 80° C., the pressure was returned to atmospheric pressure by nitrogen gas and the autoclave was cooled to room temperature.

Into the autoclave, were charged 400 ml of a deoxygenated dry heptane and 0.5 ml of a 2.0 M heptane solution of triisobutylaluminum (1.0 mmol) under dry nitrogen flow, and the mixture was stirred for a while at 350 rpm. Separately, into a 50-ml Schlenk bottle having fully purged with nitrogen, were charged 10 ml of toluene and 0.5 ml of a 2 M heptane solution of triisobutylaluminum (1.0 mmol), 1.0 ml of a 2.0 M toluene solution of methylaluminoxane (MAO) (2.0 mmol) and 0.2 ml of a 10 μmol/L heptane slurry of 1,2-ethanediyl(2-indenyl)(1-(2-isopropylindenyl)) hafnium dichloride (2.0 μmol), and the mixture was stirred at room temperature for 3 min. The catalyst slurry thus prepared was rapidly charged into the autoclave, and then the stirring of the mixture was initiated at 1,200 rpm. Then, propylene was introduced into the autoclave to slowly increase the total pressure to 0.8 MPa (Gauge), and at the same time, the temperature was slowly raised to 50° C. The polymerization was continued for 60 min. After completion of the polymerization, the remaining propylene was released, and the reaction mixture was poured into 2 L of methanol to precipitate polypropylene, which was then filtered and dried to obtain polypropylene.

(3) Calendering

A calendered sheet was produced in the same manner as in Example 3 except that the heating roll temperature was changed to 145° C. The resin properties and the properties of sheet are shown in Table 2.

TABLE 2

|  |  | Ex. 3 | Ex. 4 | Com. Ex. 4 |
|---|---|---|---|---|
| Resin Properties |  |  |  |  |
| H25 | (wt%) | 15 | 15 | 0 |
| Tm | (° C.) | 75 | 81 | 130 |
| ΔH | (J/g) | 16 | 21 | 92 |
| 6 × (Tm − 140) |  | −390 | −354 | −60 |
| [mmmm] | (mol%) | 49 | 49 | 78 |
| [rrrr]/(1-[mmmm]) |  | 0.05 | 0.05 | 0.018 |
| [rmrm] | (mol%) | 3.4 | 3.4 | 0.6 |
| mm × rr/(mr)$^2$ |  | 1.5 | 1.5 | 4.97 |
| 2,1-Insertion | (mol%) | 0 | 0 | 0 |
| 1,3-Insertion | (mol%) | 0 | 0 | 0.3 |
| Mw/Mn |  | 2.1 | 2.1 | 2.2 |
| [η] | (dl/g) | 1.2 | 1.2 | 1.7 |

TABLE 2-continued

|  |  | Ex. 3 | Ex. 4 | Com. Ex. 4 |
|---|---|---|---|---|
| Properties of Sheet |  |  |  |  |
| Tensile Modulus (TM) | (MPa) | 50 | 60 | 1300 |
| 5 × Tm − 450 |  | −75 | −45 | 200 |
| Internal haze | (%) | 8 | 15 | 45 |

EXAMPLE 6

(1) Preparation of Catalyst

The same procedure as in Step 1 of Example 1 was repeated to prepare (1,2'-dimethylsilylene)(2,1'-dimethylsilylene)-bis(3-n-butylindenyl)zirconium dichloride.

(2) Polymerization of Propylene

The same procedure as in Step 2 of Example 1 was repeated to prepare a propylene homopolymer.

The evaluation of the rein properties of the powdery propylene homopolymer was made by the methods described above. The following additives were blended with the propylene homopolymer, and the blend was granulated into pellets by extruding from a single-screw extruder (TLC35-20 Model available from Tsukada Juki Seisakusho Co., Ltd.).
Additive Formulation
  Phenol Anti-oxidant
  Irganox 1010 available from Ciba Specialty Chemicals Corp.: 1,000 ppm
  Phosphorus Anti-oxidant
  P-EPQ available from Clarient Corp.: 500 ppm
  Nucleating Agent
  Calcium stearate: 500 ppm
  DHT-4A available from Kyowa Kagaku Kogyo Co., Ltd.: 500 ppm The pellets were injection-molded using an injection-molding machine IS25EP available from Toshiba Kikai Co., Ltd., under the following conditions:
  Cylinder temperatures: 120° C., 120° C., 120° C. and 100° C. from nozzle side toward feed zone
  Mold temperature: 30° C.
  Injection pressure: 1.2 times a minimum filling pressure The properties of the injection-molded article were measured by the evaluation methods for calendered or injection-molded articles mentioned above. The results are shown in Table 3.

COMPARATIVE EXAMPLE 5

(1) Preparation of Catalyst

The same procedure as in Step 1 of Comparative Example 3 was repeated to prepare (1,2'-ethylene)(2,1'-ethylene)-bis(3-methylindenyl)zirconium dichloride.

(2) Polymerization

The same procedure as in Step 2 of Comparative Example 3 was repeated to prepare polypropylene.

The resin properties of the powdery polypropylene were measured in the same manner as in Example 6. Further, the same additives as in Example 6 were blended with the powdery polypropylene, and the blend was extruded into pellets using the same extruder as used in Example 6. The pellets were injection-molded in the same manner as in Example 6, and the properties of the injection-molded article were measured by the evaluation methods for calendered or injection-molded articles mentioned above. The results are shown in Table 3.

COMPARATIVE EXAMPLE 2

Polypropylene was prepared in the same manner as in Step 3 of Comparative Example 1 using the solid catalyst component (A) prepared in the same manner as in Steps 1 and 2 of Comparative Example 1.

The resin properties of the powdery polypropylene were measured in the same manner as in Example 6. Separately, the powdery polypropylene was blended with 2,5-dimethyl-2,5-di-(tert-butylperoxy)-hexene and then with an antioxidant, a stabilizer and a chlorine scavenger. The blend was extruded into pellets using a 40 mmϕ extruder. Although it was attempted to injection-mold the pellets under the same conditions as in Example 6, the pellets gave no satisfactory molded article. Therefore, the injection-molding was performed by raising the cylinder temperature to 230° C. The results are shown in Table 3.

TABLE 3

|  |  | Ex. 6 | Com Ex. 5 | Com. Ex. 2 |
|---|---|---|---|---|
| Resin Properties |  |  |  |  |
| H25 | (wt%) | 17 | 0 | 6 |
| [η] | (dl/g) | 2.5 | 1.0 | 2.3 |
| [mmmm] | (mol%) | 41 | 63.5 | 65 |
| [rrrr]/(1-[mmmm]) |  | 0.04 | 0.019 | 0.23 |
| [rmrm] | (mol%) | 3.2 | 1.0 | 1.4 |
| mm × rr/(mr)$^2$ |  | 1.2 | 2.5 | 6.1 |
| 2,1-Insertion | (mol%) | 0 | 0 | 0 |
| 1,3-Insertion | (mol%) | 0 | 0 | 0 |
| Mw/Mn |  | 2.2 | 1.8 | 2.7 |
| Tm | (° C.) | n.d. | 102 | 158.6 |
| 6 × (Tm − 140) |  | n.d. | −228 | 111.6 |
| ΔH | (J/g) | n.d. | 51 | 61 |
| Properties of Molded Article |  |  |  |  |
| Tensile Modulus (TM) | (MPa) | 40 | 260 | 330 |
| 5 × Tm − 450 |  | n.d. | 60 | 343 |
| Internal haze | (%) | 5 | 20 | 55 |

Note: n. d.: No melting point (Tm) was detected

Tensile modulus, haze and transparency were evaluated on a 1-mm thick specimen.

EXAMPLE 8

An injection-molded article was produced in the same manner as in Example 6 except for using pellets produced in the same manner as in Steps 1 and 2 of Example 3. The resin properties and the properties of the molded article are shown in Table 4.

EXAMPLE 9

An injection-molded article was produced in the same manner as in Example 8 except for using the following additives. The resin properties and the properties of the molded article are shown in Table 4.
Additive Formulation
  Anti-oxidant
  Irganox 1010 available from Ciba Specialty Chemicals Corp.: 500 ppm
  Irgaphos 168 available from Ciba Specialty Chemicals Corp.: 1,000 ppm Nucleating Agent Gelol MD available from New Japan Chemical Co., Ltd.: 2,000 ppm

COMPARATIVE EXAMPLE 6

An injection-molded article was produced in the same manner as in Example 6 except for using polypropylene produced in Comparative Example 4 and changing the cylinder temperatures to 190° C., 200° C., 190° C. and 170° C. from the nozzle side toward the feed z The resin properties and the properties of the molded article are shown in Table 4.

TABLE 4

|  |  | Ex. 8 | Ex. 9 | Com. Ex. 6 |
|---|---|---|---|---|
| Resin Properties |  |  |  |  |
| H25 | (wt%) | 16 | 16 | 0 |
| Tm | (° C.) | 75 | 80 | 130 |
| ΔH | (J/g) | 16 | 20 | 92 |
| 6 × (Tm − 140) |  | −390 | −360 | −60 |
| [mmmm] | (mol%) | 49 | 49 | 78 |
| [rrrr]/(1-[mmmm]) |  | 0.05 | 0.05 | 0.018 |
| [rmrm] | (mol%) | 3.4 | 3.4 | 0.6 |
| Mm × rr/(mr)² |  | 1.5 | 1.5 | 4.97 |
| 2,1-Insertion | (mol%) | 0 | 0 | 0 |
| 1,3-Insertion | (mol%) | 0 | 0 | 0.3 |
| Mw/Mn |  | 2.1 | 2.1 | 2.2 |
| [η] | (dl/g) | 1.2 | 1.2 | 1.7 |
| Properties of Molded Article |  |  |  |  |
| Tensile Modulus (TM) | (MPa) | 55 | 55 | 1330 |
| 5 × Tm − 450 |  | −75 | −50 | 200 |
| Internal haze | (%) | 13 | 17 | 48 |

INDUSTRIAL APPLICABILITY

The polypropylene-based calendered or injection-molded article of the present invention is less tacky and excellent in flexibility and transparency, therefore, suitable as artificial leather, waterproof cloth, laminates, automotive interior trims, housings of domestic electric appliances, etc.

What is claimed is:

1. A polypropylene-based shaped article selected from the group consisting of calendered articles and injection-molded articles, the article satisfying the following requirements of:

(1) having a tensile modulus TM of 40 to 70 MPa; and
   (2) having, when measured by a differential scanning calorimeter (DSC), no melting point or a melting point Tm (° C.) satisfying the following formula:

$TM \geq 5 \times Tm - 450$;

wherein the polypropylene-based shaped article comprises a propylene polymer [A] having a meso pentad fraction [mmmm] of from 20 to 49 mol %.

2. The polypropylene-based shaped article according to claim 1, comprising a propylene polymer [A] satisfying the following requirements of:

(1) having a component soluble in a 25° C. hexane in a content H25 of 0 to 80% by weight;
   (2) having, when measured by a differential scanning calorimeter (DSC), no melting point or a melting point Tm (° C.) satisfying the following formula:

$\Delta H \geq 6 \times (Tm - 140)$ wherein ΔH is a melting endotherm (J/g); and (3) having an intrinsic viscosity [η] of 1 to 3 dl/g as measured at 135° C. in tetralin.

3. The polypropylene-based shaped article according to claim 2, wherein the propylene polymer [A] is a propylene homopolymer [A-1] having:

(1) a racemic pentad fraction [rrrr] satisfying, together with 1−[mmmm], the following formula:

$[rrrr]/(1-[mmmm]) \leq 0.1$.

4. The polypropylene-based shaped article according to claim 3, wherein the propylene homopolymer [A-1] has a pentad fraction [mrmr] of more than 2.5 mol %.

5. The polypropylene-based shaped article according to claim 3, wherein the propylene homopolymer [A-1] has a meso triad fraction (mm) and a racemic triad fraction (rr) satisfying the following formula:

$(mm) \times (rr)/(mr)^2 \leq 2.0$.

6. The polypropylene-based shaped article according to claim 2, wherein the propylene polymer [A] is produced by polymerizing propylene, or polymerizing propylene with ethylene and/or $C_4$-$C_{20}$ α-olefin, in the presence of a polymerization catalyst comprising:

(A) a transition metal compound represented by the following general formula (I):

(I)

wherein M is a metal element of Groups 3 to 10 or lanthanum series of the Period Table;

$E^1$ and E are the same or different and each independently a ligand selected from the group consisting of substituted cyclopentadienyl, indenyl, substituted indenyl, heterocyclopentadienyl, substituted heterocyclopentadienyl, amido, phosphide, hydrocarbyl and silicon-containing group; and $E^1$ and $E^2$ are cross-linked via $A^1$ and $A^2$;

X is a σ-bonding ligand; and a plurality of X, if any, may be same or different and each X may be cross-linked with another X, $E^1$, $E^2$ or Y;

Y is a Lewis base; and a plurality of Y, if any, may be same or different and each Y may be cross-linked with another Y, $E^1$, $E^2$ or X;

$A^1$ and A2 may be the same or different divalent group for cross-linking two ligands $E^1$ and $E^2$ and each independently is $C_1$-$C_{20}$ hydrocarbyl, $C_1$-$C_{20}$ halogen-containing hydrocarbyl, silicon-containing group, germanium-containing group, tin-containing group, —O—, —CO—, —S—, —$SO_2$—, —Se—, —NR—, —PR—, —P(O)R—, —BR— or —AlR— wherein R is hydrogen, halogen, $C_1$-$C_{20}$ hydrocarbyl or $C_1$-$C_{20}$ halogen-containing hydrocarbyl;

q is an integer of 1 to 5 given by the formula, [(valence of M)−2]; and r is an integer of 0 to 3, and (B) at least one component selected from the group consisting of a compound (B-1) capable of forming an ionic complex by reacting with said transition metal compound (A) or a derivative thereof, and an aluminoxane (B-2).

7. The polypropylene-based shaped article according to claim 1, wherein an internal haze is 50% or less.

8. The polypropylene-based shaped article according to claim 1, wherein an internal haze is 20% or less.

9. The polypropylene-based shaped article according to claim 1, wherein the shaped article is produced by calendering or injection-molding at 80 to 300° C.

10. The polypropylene-based shaped article according to claim 3, wherein the propylene polymer [A] is produced by polymerizing propylene, or polymerizing propylene with ethylene and/or $C_4$–$C_{20}$ α-olefin, in the presence of a polymerization catalyst comprising:

(A) a transition metal compound represented by the following general formula (I):

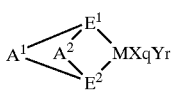

(I)

wherein M is a metal element of Groups 3 to 10 or lanthanum series of the Period Table;

$E^1$ and $E^2$ are the same or different and each independently a ligand selected from the group consisting of substituted cyclopentadienyl, indenyl, substituted indenyl, heterocyclopentadienyl, substituted heterocyclopentadienyl, amido, phosphide, hydrocarbyl and silicon-containing group; and $E^1$ and $E^2$ are cross-linked via $A^1$ and $A^2$;

X is a σ-bonding ligand; and a plurality of X, if any, may be same or different and each X may be cross-linked with another X, $E^1$, $E^2$ or Y;

Y is a Lewis base; and a plurality of Y, if any, may be same or different and each Y may be cross-linked with another Y, $E^1$, $E^2$ or X;

$A^1$ and $A^2$ may be the same or different divalent group for cross-linking two ligands $E^1$ and $E^2$ and each independently is $C_1$–$C_{20}$ hydrocarbyl, $C_1$–$C_{20}$ halogen-containing hydrocarbyl, silicon-containing group, germanium-containing group, tin-containing group, —O—, —CO—, —S—, —SO$_2$—, —Se—, —NR—, —PR—, —P(O)R—, —BR— or —AlR— wherein R is hydrogen, halogen, $C_1$–$C_{20}$ hydrocarbyl or $C_1$–$C_{20}$ halogen-containing hydrocarbyl;

q is an integer of 1 to 5 given by the formula, [(valence of M)–2]; and r is an integer of 0 to 3, and (B) at least one component selected from the group consisting of a compound (B-1) capable of forming an ionic complex by reacting with said transition metal compound (A) or a derivative thereof, and an aluminoxane (B-2).

11. The polypropylene-based shaped article according to claim 4, wherein the propylene polymer [A] is produced by polymerizing propylene, or polymerizing propylene with ethylene and/or $C_4$–$C_{20}$ α-olefin, in the presence of a polymerization catalyst comprising:

(A) a transition metal compound represented by the following general formula (I):

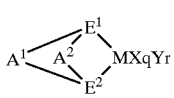

(I)

wherein M is a metal element of Groups 3 to 10 or lanthanum series of the Period Table;

$E^1$ and E are the same or different and each independently a ligand selected from the group consisting of substituted cyclopentadienyl, indenyl, substituted indenyl, heterocyclopentadienyl, substituted heterocyclopentadienyl, amido, phosphide, hydrocarbyl and silicon-containing group; and $E^1$ and $E^2$ are cross-linked via $A^1$ and $A^2$;

X is a σ-bonding ligand; and a plurality of X, if any, may be same or different and each X may be cross-linked with another X, $E_1$, $E^2$ or Y;

Y is a Lewis base; and a plurality of Y, if any, may be same or different and each Y may be cross-linked with another Y, $E^1$, $E^2$ or X;

$A^1$ and $A^2$ may be the same or different divalent group for cross-linking two ligands $E^1$ and $E^2$ and each independently is $C_1$–$C_{20}$ hydrocarbyl, $C_1$–$C_{20}$ halogen-containing hydrocarbyl, silicon-containing group, germanium-containing group, tin-containing group, —O—, —CO—, —S—, —SO$_2$—, —Se—, —NR—, —PR—, —P(O)R—, —BR— or —AlR— wherein R is hydrogen, halogen, $C_1$–$C_{20}$ hydrocarbyl or $C_1$–$C_{20}$ halogen-containing hydrocarbyl;

q is an integer of 1 to 5 given by the formula, [(valence of M)–2]; and r is an integer of 0 to 3, and (B) at least one component selected from the group consisting of a compound (B-1) capable of forming an ionic complex by reacting with said transition metal compound (A) or a derivative thereof, and an aluminoxane (B-2).

12. The polypropylene-based shaped article according to claim 5, wherein the propylene polymer [A] is produced by polymerizing propylene, or polymerizing propylene with ethylene and/or $C_4$–$C_{20}$ α-olefin, in the presence of a polymerization catalyst comprising:

(A) a transition metal compound represented by the following general formula (I):

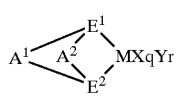

(I)

wherein M is a metal element of Groups 3 to 10 or lanthanum series of the Period Table;

$E^1$ and $E^2$ are the same or different and each independently a ligand selected from the group consisting of substituted cyclopentadienyl, indenyl, substituted indenyl, heterocyclopentadienyl, substituted heterocyclopentadienyl, amido, phosphide, hydrocarbyl and silicon-containing group; and $E^1$ and $E^2$ are cross-linked via $A^1$ and $A^2$;

X is a σ-bonding ligand; and a plurality of X, if any, may be same or different and each X may be cross-linked with another X, $E^1$, $E^2$ or Y;

Y is a Lewis base; and a plurality of Y, if any, may be same or different and each Y may be cross-linked with another Y, $E^1$, $E^2$ or X;

$A^1$ and $A^2$ may be the same or different divalent group for cross-linking two ligands $E^1$ and $E^2$ and each independently is $C_1$–$C_{20}$ hydrocarbyl, $C_1$–$C_{20}$, halogen-containing hydrocarbyl, silicon-containing group, germanium-containing group, tin-containing group, —O—, —CO—, —S—, —SO$_2$—, —Se—, —NR—, —PR—, —P(O)R—, —BR— or —AlR— wherein R is hydrogen, halogen, $C_1$–$C_{20}$ hydrocarbyl or $C_1$–$C_{20}$ halogen-containing hydrocarbyl;

q is an integer of 1 to 5 given by the formula, [(valence of M)–2]; and r is an integer of 0 to 3, and (B) at least one component selected from the group consisting of a compound (B-1) capable of forming an ionic complex by reacting with said transition metal compound (A) or a derivative thereof, and an aluminoxane (B-2).

* * * * *